United States Patent
Popov et al.

(10) Patent No.: US 8,793,216 B2
(45) Date of Patent: Jul. 29, 2014

(54) DATABASE REPLICATION

(75) Inventors: Peter Popov, London (GB); Vladimir Stankovic, London (GB)

(73) Assignee: The city University, London (GB)

( * ) Notice: Subject to any disclaimer, the term of this patent is extended or adjusted under 35 U.S.C. 154(b) by 0 days.

(21) Appl. No.: 13/391,662

(22) PCT Filed: Aug. 13, 2010

(86) PCT No.: PCT/GB2010/051347
§ 371 (c)(1),
(2), (4) Date: Feb. 22, 2012

(87) PCT Pub. No.: WO2011/023979
PCT Pub. Date: Mar. 3, 2011

(65) Prior Publication Data
US 2012/0150802 A1      Jun. 14, 2012

(30) Foreign Application Priority Data
Aug. 25, 2009  (GB) .................................. 0914815.6

(51) Int. Cl.
*G06F 17/30* (2006.01)
*G06F 11/16* (2006.01)
*G06F 11/14* (2006.01)

(52) U.S. Cl.
CPC ........ *G06F 11/1612* (2013.01); *G06F 11/1487* (2013.01)
USPC ........................................................ 707/635

(58) Field of Classification Search
CPC .......................... G06F 11/1612; G06F 11/1487
USPC ........................................................ 707/635
See application file for complete search history.

(56) References Cited

FOREIGN PATENT DOCUMENTS

EP       1349085 A2    10/2003

OTHER PUBLICATIONS

Vladimir Stankovic, Performance Implications of Using Diverse Redundancy for Database Replication, Feb. 2008, Centre for Software Reliability, City University, 169 pages.*
International Search Report dated Feb. 22, 2011.

(Continued)

*Primary Examiner* — Apu Mofiz
*Assistant Examiner* — Dara J Glasser
(74) *Attorney, Agent, or Firm* — Thomas|Horstemeyer, LLP

(57) ABSTRACT

A fault-tolerant node for synchronous heterogeneous database replication and a method for performing a synchronous heterogenous database replication at such a node are provided. A processor executes a computer program to generate a series of database transactions to be carried out at the fault-tolerant node. The fault-tolerant node comprises at least two relational database management systems, each of which are different relational database management system products, each implementing snapshot isolation between concurrent transactions. Each system comprises a database and a database management component. For each database transaction, operation instructions are provided concurrently to each of the systems to carry out operations on their respective databases and to provide respective responses. The responses generated by the systems either comprise an operation result or an exception. Only one of the systems is configured with a NOWAIT exception function enabled, which returns an exception when it is detected that two or more concurrent transactions are attempting to modify the same data item. The other systems are configured with the NOWAIT exception function disabled. The fault-tolerant node detects that two or more concurrent transactions are attempting to modify the same data item, and ensures that all systems apply the same order of modification of the data item by the concurrent transactions.

20 Claims, 15 Drawing Sheets

(56) References Cited

OTHER PUBLICATIONS

Elinkety, et al., "Database Replication Using Generalized Snapshot Isolation," Reliable Distributed Systems, 2005, SRDS 2005, 24th IEEE Symposium on Orlando, FL, Oct. 26-28, 2005, pp. 73-84.

"Oracle Real Application Clusters, Key Features and Benefits", Oracle Data Sheet, 2010.

Vladimir Stankovic, "Performance Implications of Using Diverse Redundancy for Database Replication", Centre for Software Reliability, City University, Feb. 2008.

* cited by examiner

I) Upon SQL operation OP
II) switch(OP)
    A) case: OP is a *begin*
        1) reset transaction abort /* set transaction abort to false */
        2) obtain the *mutex* /* among TraManagers */
        3) send *begin* to all RDBMSs /* create snapshots on the RDBMSs */
        4) wait for all RDBMSs to acknowledge the operation
        5) release the *mutex*
        6) return control to the client
    On exception /* while the *begin* is executing */
        set transaction abort
        notify the client of the exception B) case: OP is *read* or *write* operation
        1) put OP into the queues of RepManagers /* each RDBMS is served by a RepManager */
        2) receive the fastest response for the OP
        3) if the fastest response is not an exception
            a) return the response to the client
        4) else
            a) set transaction abort
            b) notify the client of the exception
        5) wait for all responses to be received
            a) if exception raised && transaction not set to abort
                i) set transaction abort
                ii) notify the client of the exception
            b) else
                i) do compare responses C) case: OP is an *abort*
        1) set transaction abort D) case: OP is a *commit*
        1) if transaction not set to *abort*
            a) wait until all available replicas have voted and the comparator has voted
                i) obtain the *mutex*
                ii) *commit* transaction on all RDBMSs /* directly access their SQL API */
                iii) wait until all replicas have responded
                iv) release *mutex*
                v) clear RepManagers queues
                vi) return to client /* return control to client */

Abort Function /* executed by a TraManager*/
I) if transaction set to abort
    A) *abort* transaction on all RDBMSs /* directly access their SQL API */
    B) wait until all RDBMSs have aborted the transaction Comparator Function /* executed by a TraManager*/
I) compare the responses from all RDBMSs
    A) if a mismatch found
        1) set transaction abort
        2) notify the client of an exception ("data inconsistency occurred")

Figure 13

I) while (non-empty queue && transaction not set to abort)
   A) fetch an operation (OP) from the RepManager queue
   B) switch(OP)
      1) case: OP is a *read* operation
         a) send OP to the own RDBMS
         b) wait for a response /* either fetched data or an exception */
         c) return response to TraManager
      2) case: OP is a *write* operation
         a) send OP to the own RDBMS
         b) wait for the response /* data or an exception */
         c) if no exception raised
            i) obtain the *write set* /*this operation may result in an exception, which would be stored in the writeset itself*/
            ii) return the write set to TraManager
         d) else
            i) return exception to TraManager
         e) default: /* incorrect operation */

Figure 14

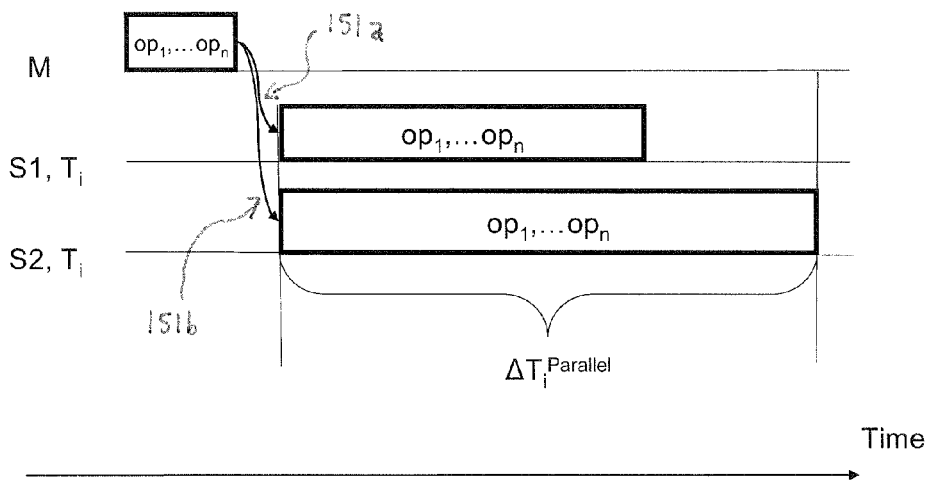

Figure 15

DATABASE REPLICATION

CROSS-REFERENCE TO RELATED APPLICATION

This application is the 35 U.S.C. §371 national stage of PCT application entitled "Improvements Relating to Database Replication," PCT/GB2010/051347, filed Aug. 13, 2010. This application also claims priority to, and the benefit of, Great Britain Application no. 0914815.6, filed Aug. 25, 2009 herein incorporated by reference in its entirety.

FIELD OF INVENTION

The present invention concerns improvements relating to database replication. More specifically, aspects of the present invention relate to a fault-tolerant node and a method for avoiding non-deterministic behaviour in the management of synchronous database systems.

DISCUSSION OF PRIOR ART

Current database replication solutions, in both academia and industry, are primarily based on the crash failure assumption, whereby it is assumed that the underlying building blocks, i.e. Relational Database Management Systems (RDBMSs), fail in a detectable way, leaving a copy of a correct database state for use in recovery. The conventional approach in database systems is to use a plurality of non-diverse replicas—RDBMSs from the same vendor—for mainly availability and scalability improvement. This is regarded as a suitable approach to addressing failure under the crash failure assumption, as use of a sufficient number of replicas tolerates crash failures and manages increased load from client applications for improved performance. The validity of this assumption has, however, been refuted in the recent work by Gashi et al. [Gashi, Popov et al. 2007] and subsequently in [Vandiver 2008]. Many of the software faults examined in these two studies caused systematic, non-crash failures, a category ignored by most standard implementations of fault-tolerant database replication solutions. The non-crash failures of RDBMS products are likely to be causing some of the following anomalies: returning incorrect results to the client application, incorrectly modifying data items in the database, arbitrarily halting a transaction or failing to execute an operation and raise an exception. These failure modes are typically associated with synchronous systems, that is, systems which either deliver a result in a predefined amount of time or are considered to have failed (timeout occurs).

The work of Gashi et al [Gashi, Popov et al. 2007] was based on two studies of samples of bug reports for four popular off-the-shelf SQL RDBMS products: Oracle, Microsoft SQL, PostgreSQL and Interbase; plus later releases of two of them: PostgreSQL and Firebird (an open source descendant of the InterBase database server). Each bug report contains a description of the bug and a bug script for reproducing the failure (the erroneous behaviour that the reporter of the bug observed). The results of the studies indicate that the bugs causing failures in more than two diverse RDBMSs are rare—only a few bugs affected two RDBMSs and none affected more than two. Thus, a very high detection rate (ranging from 94% to 100%) is achievable when using just a simple configuration with two diverse servers. Another very important finding was that crash failure assumption is unjustified. The authors showed that the majority of the collected bugs belonged to the incorrect results category, causing incorrect outputs without crashing the RDBMS products (approximately 66% of the bugs caused incorrect results failures, while roughly just 18% caused crash failures).

Similarly to the work by Gashi et al., the work in [Vandiver 2008] experimented with the faults reported for three well-known RDBMSs: DB2, Oracle and MySQL. The results show that for all three products over 50% of the bugs cause non-crash failures; resulting, for example, in incorrect results returned to a client or incorrectly modified database items.

The unfounded assumption that only crash-failures are observed in RDBMSs has lead to development of a multitude of solutions which are based on asymmetric processing of database transactions (see Appendix A). Inherent to asymmetric processing is the inability to cope with non-crash failures; e.g. if a replica is faulty, the client connected to this replica can obtain a wrong result or incorrect values could be propagated into the state of the correct replicas (see FIG. 1).

FIG. 1 illustrates the impossibility of incorrect result detection by a middleware-based database replication protocol using asymmetric transaction execution (the steps shown with dashed lines are not part of the protocol). The figure shows the execution of a read operation (read(x)) in a replicated database system consisting of three replicas $R_x$, $R_y$ and $R_z$. The execution steps are as follows: the client sends 1 the read operation to the middleware, M; the middleware forwards 2 the request to only one replica, $R_x$; $R_x$ executes the request and sends 3 the result to the middleware and middleware notifies 4 the client of the result. If $R_x$ is faulty, an incorrect response will be forwarded to the client with no possibility for detection, since the execution of the read operation is executed on only one replica. On contrary, if all replicas were sent 2, 2a, 2b the read request it would be possible for middleware to adjudicate the responses sent 3, 3a, 3b by all replicas and detect the incorrect $R_x$ response.

The family of multicast replication protocols is generally used for implementing asymmetric transaction processing. These protocols use a GCS (Group Communications System), which makes it possible for any replica to send a message to all other replicas (including itself) with the guarantee that the message will be delivered if no failures occur. Furthermore, GCS is capable of guaranteeing totally ordered messages: if two replicas receive messages m and m', they both receive the messages in the same order. In fact, a GCS may offer a range of different guarantees and total ordering is one of the more expensive options. The known DB replication solutions rely on GCS being configured to offer total ordering. The principal steps behind a multicast replication protocol are as follows: a transaction $T_i$ is submitted to one, local replica (all other replicas are called remote for $T_i$); the local replica executes completely the transaction and extracts the results of all the modifying operations in a writeset; in the end of transaction $T_i$'s writeset is sent to all remote replicas in total order using the underlying GCS; upon receiving the $T_i$'s writeset every replica installs the writeset in the same total order imposed by the GCS. The installation of the writesets in the same total order is necessary to avoid data inconsistencies due to non-determinism on the replicas. Otherwise, if the total order was not respected it would be possible for two replicas to install overlapping writesets in a different order, which would result in an inconsistent state of the replicated system. Some examples of multicast-based replication protocols used with RDBMSs providing snapshot isolation (see Appendix A) are described in [Lin, Kemme et al. 2005] and [Kemme and Wu 2005].

Two recent database replication protocols are built on a more general failure model than crash failures: HRDB (Heterogeneous Replicated DataBase) [Vandiver 2008] and Byzantium [Preguiça, Rodrigues et al. 2008] approaches. HRDB's SES (Snapshot Epoch Scheduling) protocol and Byzantium are of particular interest because they assume, that the underlying replicas guarantee snapshot isolation. Both HRDB and Byzantium assume that an arbitrary failure can occur, i.e. a Byzantine failure model (described for the first time in [Lamport, Shostak et al. 1982]) is assumed. This failure model is the most general one, where beside crash failures, for example, incorrect results of read and write operations are also allowed; even malicious behaviour by the replicas such as sending conflicting messages to the other replicas are allowed by the Byzantine failure model.

Both HRDB and Byzantium are primary/secondary, middleware-based replication protocols, which tolerate non-crash failures by voting on the results coming from different replicas. FIG. 1 illustrates the generic primary/secondary database replication approach. The Client (C) first sends 21 the operations $\{op_1, \ldots, op_k, \ldots, op_n\}$ of the transaction $T_i$ to the Primary replica (P) for execution, and only once the Primary executes the operations it forwards 22a, 22b them to the Secondaries $\{S_1, \ldots, S_m\}$. Therefore, in both protocols, write operations are firstly executed on one (primary) replica and only then sent to the secondary replicas in order to guarantee replica consistency—in this way the conflicting operations are executed in the same order (the one imposed by the primary) on all replicas and thus non-determinism between conflicting modifying transactions are avoided. However, in this way no parallelism in the execution of the same write operations between the primary on the one hand and secondary replicas on the other hand is allowed; as a result the total duration of a transaction may be significantly prolonged (as shown in FIG. 3) even in the arguably more common case when no write-write conflicts (see appendix A) occur between the concurrently executing transactions.

Although both HRDB and Byzantium use a primary/secondary approach, there is a difference between the two as to when the primary forwards the (write) operations for execution to the secondaries. In HRDB every write operation is sent to the secondaries as soon as it is completed on the primary (possibly after its concurrency control mechanism resolves the conflicts between concurrent write operations), see FIG. 3. The read operations in HRDB, on the other hand, are executed in parallel on primary and secondary replicas.

More specifically, FIG. 3 shows a timing diagram of the execution of a write operation in HRDB scheme consisting of the primary (P) and two secondary replicas (S1 and S2). The meaning of the callouts is as follows: the middleware (M) sends 31 the write operation, w(x), to the primary replica for execution; once the primary has executed the write, it notifies 32 the middleware by sending it the result of w(x); middleware forwards 33a, 33b the write operation to the secondary replicas for execution. Performance overhead ensues because the write operation is not executed in parallel between the primary and the secondary replicas. As a result, the operation duration as perceived by the middleware is prolonged ($T_{w(x)}^{Sequential}$), as opposed to it being shorter due to parallel execution on all replicas ($T_{w(x)}^{Parallel}$). The execution order in the primary/secondary scheme causes transactions to retain the write locks for longer and this leads to an increased likelihood of a write-write conflict with the other concurrent transactions. Even though HRDB (as well as Byzantium) uses database systems which offer snapshot isolation, the low level implementation of the concurrency control mechanisms in these database systems still relies on the use of locking mechanisms on shared resources by multiple concurrent users.

The situation with Byzantium is different in a number of respects. First, all operations, both reads and writes, of a transaction are executed on the primary replica (the work in [Preguiça, N., R. Rodrigues, et al. 2008] uses the term "coordinator replica" for the primary) and the respective responses collected for future use. Also, different from HRDB, Byzantium assumes that different transactions are assigned to different coordinator replicas. Subsequently, the commit phase is initiated and only then all operations and the respective results are forwarded by the primary to the secondaries for validation: the secondaries then execute all operations and compare them with the responses of the primary. In this way no parallelism between the operations' execution on the primary and the secondaries exist, which makes this scheme inferior in terms of response time in comparison with HRDB.

More specifically, FIG. 4 shows the timing diagram of executing transaction $T_i$, consisting of three operations: w(y), r(x) and r(z), on three Byzantium replicas (P, S1 and S2). The transaction duration is prolonged because all the operations are first executed on the primary replica and only then forwarded to the secondaries. Hence, instead of the transaction execution being parallelised on all replicas and its duration dictated by the slowest one ($\Delta T_i$ (MAX ($T_i^P, T_i^{S1}, T_i^{S2}$)), in this case secondary replica S2 is the slowest), the duration is the sum of the primary's and the slower secondary processing ($\Delta T_i^{Sequential}$).

The HRDB approach does not compare the responses from the read operations; albeit this possibility is discussed in [Vandiver 2008]. The Byzantium protocol, on the other hand, includes the validation of the results coming from all types of operations.

Compared to conventional database replication approaches, the HRDB and Byzantium approaches are complex and slow. It is, thus, desirable to develop an approach for processing of database transactions which is not limited to the crash failure assumption but which allows more economical and efficient operation than the HRDB and Byzantium approaches.

SUMMARY OF THE INVENTION

Accordingly, the invention provides a fault-tolerant node for synchronous heterogenous database replication whereby the fault-tolerant node is adapted to carry out a series of database transactions generated by a processor executing a computer program at the fault-tolerant node, wherein the fault-tolerant node comprises at least two relational database management systems, the systems being instances of different relational database management system products which provide snapshot isolation between concurrent transactions and each system comprising a database and a database management component, wherein for each database transaction, operation instructions are provided concurrently to each of the systems to carry out operations on their respective databases and to provide respective responses; wherein the responses generated by the systems either comprise an operation result or an exception, and where only one of the systems is configured with a NOWAIT exception function enabled which returns an exception when it is detected that two or more concurrent transactions are attempting to modify the same data item and the other systems are configured with the NOWAIT exception function disabled, whereby the fault-tolerant node is adapted to detect that two or more concurrent transactions are attempting to modify the same data item and to block one or more of the transactions to ensure that all systems apply the same order of modification of the data item by the concurrent transactions.

With such an approach, the consequences of non-deterministic behaviour of the systems are avoided. Such a node is capable of tolerating crash failures and incorrect results by the replicas. This also allows for a solution which is faster than prior art protocols such as HRDB and Byzantium.

A set of operation instructions may include a begin instruction, a commit instruction and an abort instruction for control of execution of a transaction. Advantageously, only one transaction can execute a begin instruction or a commit instruction at a time for all the systems. When an exception is received as an operation result from one of the systems, the fault-tolerant node provides an abort instruction for that transaction for all the systems. In one preferred arrangement, execution of a begin operation for a transaction comprises setting a variable indicating that the transaction is not, or no longer, aborted, and by acquiring control of commit and begin operations so that no other begin or commit operation can take place until the begin operation is completed. In one arrangement, execution of a commit operation for a transaction comprises confirming that the transaction has not been marked to be aborted, determining that the operation results from the systems allow a transaction results to be provided, determining that the operation results are consistent, and by acquiring control of commit and begin operations so that no other begin or commit operation can take place until the commit operation is completed.

The set of operations comprises a read operation and a write operation, and in executing a write operation the node extracts a write set on which operations are performed before the transaction is committed. When all systems have failed to provide a result to a read operation or a write operation within a predetermined time, fault-tolerant node raises an exception.

In one preferred arrangement, the fault-tolerant node comprises a transaction manager to control the execution of the operations for one transaction in each of the systems and a replica manager for each of the systems used to execute a transaction to provide operations to its associated system, wherein for each transaction, the transaction manager provides operations required for execution of the transaction into a queue for each system managed by the replica manager for that system, wherein the operations are provided to each system from the queue by the replica manager for that system.

Preferably, the fault-tolerant node comprises a comparator function to compare operation results received from the systems to enable the fault-tolerant node to determine whether the transaction has completed successfully. The fault-tolerant node may then abort the transaction if the comparator function indicates a mismatch between operation results received from different systems. This arrangement contributes to the achieved dependability of the node, as it enables the recognition of many cases of a failure.

In one preferred arrangement (an optimistic regime of operation), the fault-tolerant node returns the first operation result received from any of the systems to the computer program, and provides a further message to the computer program if the transaction aborts or if the operation results received from all the systems are not consistent (e.g. typically identical, or considered to be identical when the internal representation of data in the different systems introduces small differences even for the same data). Alternatively, in a pessimistic regime of operation, the fault-tolerant node returns an operation result to the computer program only when the operation results from all the systems have been received and evaluated by the fault-tolerant node.

In the fault-tolerant node described above, the different relational database management system products may comprise two or more systems that implement snapshot isolation between concurrent transactions, such as Oracle, Microsoft SQL 2005 or later, PostgreSQL, Interbase and Firebird.

In a further aspect, the invention provides a database server comprising a fault-tolerant node as set out above. Such a database server can be provided as part of any computational system in which it is necessary or desirable for one or more databases to achieve the performance resulting from use of embodiments of the invention.

In a further aspect, the invention provides a method for performing a synchronous heterogenous database replication, for a series of database transactions provided by a processor executing a computer program, at a fault-tolerant node comprising at least two relational database management systems, the systems being instances of different relational database management system products which provide snapshot isolation with each system comprising a database and a database management component, the method comprising: receiving a database transaction at the fault-tolerant node; providing operation instructions for the database transaction concurrently to each of the systems to carry out operations on their respective databases and to provide respective responses; the systems each generating a response to an operation instruction which comprises an operation result or an exception, wherein only one of the systems is configured with a NOWAIT exception function enabled such that that system returns an exception when it is detected that two or more concurrent transactions are attempting to modify the same data item and the other systems are configured with the NOWAIT exception function disabled; whereby the fault-tolerant node detects that two or more concurrent transactions are attempting to modify the same data item and ensures that all systems apply the same order of modification of the data item by the concurrent transactions.

In a yet further aspect, the invention provides a fault-tolerant node for avoiding non-deterministic behaviour in data management whereby a processor executes a computer program to generate a series of database transactions to be carried out at the fault-tolerant node, the fault-tolerant node comprising at least two relational database management systems, the systems being instances of different relational database management system products and each comprising a database and a database management component, wherein for each database transaction, operation instructions are provided concurrently to each of the systems to carry out operations on their respective databases and to provide operation results; wherein the fault-tolerant node compares operation results generated by the systems to validate the result of the database transaction.

BRIEF DESCRIPTION OF THE FIGURES

Embodiments of the invention are described below, by way of example, with reference to the accompanying Figures, of which:

FIG. 13 shows pseudo code illustrating the execution of the DivRep protocol on a TraManager as used in the FT-node of FIG. 5;

FIG. 14 shows pseudo code illustrating the execution of the DivRep protocol on a RepManager as used in the FT-node of FIG. 5;

FIG. 15 shows a timing diagram of the execution of a transaction using the DivRep protocol as shown in FIG. 13;

DETAILED DESCRIPTION OF EMBODIMENTS

An embodiment of an approach to database replication will now be described, for which diverse (i.e. different by design, developed by different software vendors) relational database management systems (RDBMSs) are used which offer snapshot isolation between concurrent transactions. This is a departure from the prior art, where non-diverse databases have always been considered to be adequate for database replication, in order to cope with the software failures and guarantee consistency of the data on all replicas. Database replication assumed in the present embodiment is of "share nothing" type, where each RDBMS interacts with its own, full copy of the database. This is in contrast to some widespread commercial solutions such as Real Application Cluster (RAC) from Oracle which uses "share all" approach, where one copy of the database is shared by a cluster of RDBMSs. In this embodiment database transactions are directed to a specially constructed node (hereafter called an FT-node) which is tolerant of certain database faults. Such an FT-node is schematically represented in FIG. 5.

Figure 5:
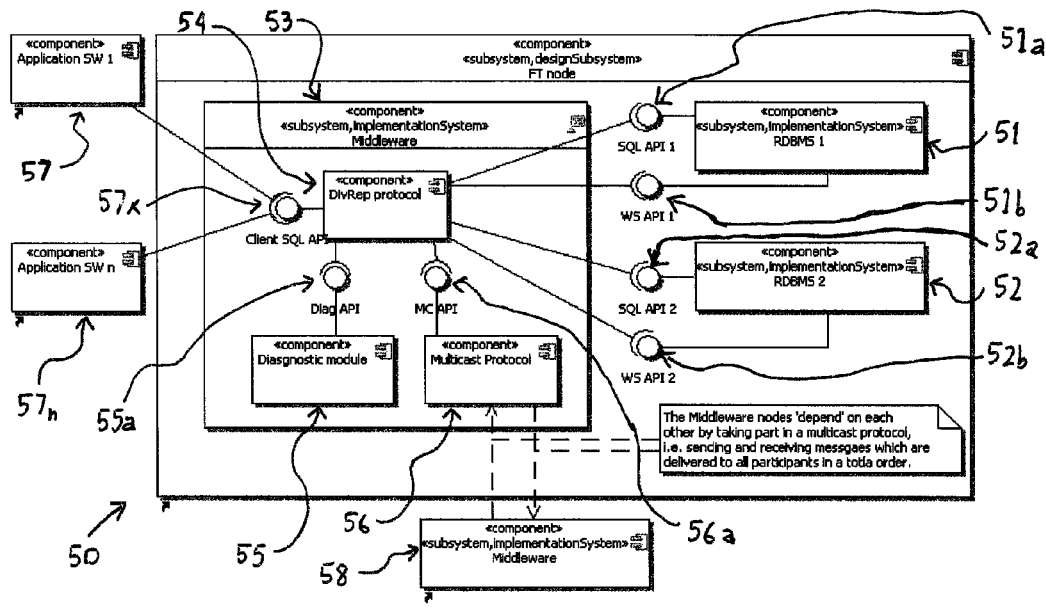
FIG. 5 shows an embodiment of a fault-tolerant node (FT-node) as a UML Component diagram.

FIG. 5 is a UML (Unified Modelling Language) Component diagram of an FT-node 50. An FT-node is an instantiation of a database server which embodies aspects of the invention. Referring to FIG. 5, it can be seen that the FT-node (FT stands for fault-tolerant) consists of three software components: RDBMS1 51, RDBMS2 52 and Middleware 53. The components RDBMS1 51 and RDBMS2 52 consist of the software responsible for data management (SQL engines) and the data itself (in the form of tables, views, stored procedures, triggers, etc. stored in one or multiple computer files) as required by the respective SQL server engine. The component Middleware 53 consists of three components: a DivRep protocol module 54, a Diagnostic module 55 and a Multicast protocol module 56. The DivRep protocol 54 module utilises a DivRep protocol which is a replication protocol, that works with the diverse (heterogeneous) databases, RDBMS1 and RDBMS2, via the interfaces each of them provides (SQL API 1, WS API 1 (shown by reference numbers 51*a* and 51*b* provided by RDBMS1, and SQL API 2, WS API 2 (shown by reference numbers 52*a* and 52*b*) provided by RDBMS 2).

In the arrangement shown in FIG. 5, there are two RDBMSs present. For many practical purposes, effective embodiments will be provided using two RDBMSs, each of a different type (for example, one Oracle and one Microsoft SQL 2005). In some cases, it may be desirable to use a further RDBMS—this may, for example, improve further the prospect of detecting simultaneous and identical failures of more than one RDBMS.

The interaction between the components of the FT-node 50 consists of the Middleware 53 sending operations to the RDBMSs 51, 52, and the RDBMSs 51, 52 responding to these by either confirming that the operation has been completed successfully or instead reporting an abnormal completion of the operation. The operations offered by the SQL API allow for managing data objects in databases (the so called Data Definition Language (DDL) operations, such as creating/deleting/modifying tables, views, etc.) and also for data (content) management (i.e. selecting data from and inserting/deleting/modifying data in the existing objects, referred to as Data Manipulation Language (DML) operations). Another set of operations is typically offered by off-the-shelf RDBMSs to control the privileges of different users to manipulate the data objects (such as GRANT and REVOKE, frequently referred to as Data Control Language operations)—while these may be used in embodiments of the invention, they are not of significance to the FT-node functionality described here and will not be described further below.

SQL API (as represented by 57*x*, 51*a* and 52*a*) offer also a set of operations for connecting external agents 57, 57*n* (e.g. application software) to RDBMSs 51, 52 (establishing connections), managing transactions (i.e. a set of operations treated by the engine as an atomic whole as defined in Appendix A) such as begin, commit or abort a transaction. A set of operations in the SQL API allow for setting the isolation level between the transactions. In the particular case, it is assumed that the RDBMSs offer support for snapshot isolation between the transactions (see Appendix A).

When an operation is completed successfully, the RDBMSs 51, 52 will return, via the SQL API, either the requested data (in the case of a read operation) or a notification that the operation is completed successfully (e.g. in the case of inserting new data, the RDBMS will typically return the number of newly inserted rows). In case no result is received, within a predefined amount of time (timeout occurs), DivRep protocol module 54 raises a timeout exception.

When an operation is completed abnormally, the RDBMS 51, 52 will typically raise an exception (i.e. a signal) to the Middleware 53 detailing the problem (e.g. that the SQL syntax of the submitted operation is incorrect). Of the many possible exceptions, it is assumed here that at least one of the RDBMSs 51, 52 used in the FT-node 50 offers a NOWAIT exception feature (hereinafter also referred to as 'a NOWAIT exception') immediately upon detection by that RDBMS that two concurrent transactions attempt to modify the same data item (e.g. to alter the same row in the same table of the same database). The feature is typically implemented as part of the first phase of a 2-phase lock protocol (see Appendix A for discussion of a conventional 2-phase locking protocol): the transaction, which finds the write lock on a record taken by another transaction will be interrupted by a NOWAIT exception and the modifications of the particular record by the interrupted transaction will be discarded by the SQL server engine, on which the interrupted transaction is executed. Many off-the-shelf products (e.g. Oracle, PostgreSQL, Firebird, etc.) offer the functionality of a NOWAIT exception feature, albeit implemented differently and for different purposes than described here.

WS API 51b, 52b offer ways for the agent connected to the RDBMS to extract the write sets, (hence the term WS API is used) of a transaction. Typically, WS API is not a standard feature of an off-the-shelf RDBMS. If a RDBMS is to be used which does not have this feature, custom-built software for write set extraction needs to be added either by modifying the SQL engines or by adding a module, which uses proprietary features of the respective SQL engine. The format of the write sets may vary, but a reasonable approximation is to think of them as if they were stored in a separate table (as the transaction modifies the data), from which the agent can read using the transaction ID as a parameter. The ability to modify the SQL engines or to add such a module will be well within the ability of the skilled addressee following this specification and so is not described further herein.

The components SW 1 to SW n (shown by reference numbers 57 and 57n) represent the client applications interacting with the FT-node 50. The Client SQL API 57x, provided by the Middleware 53, offers functionality similar to that offered by the SQL API 51a and 52a: DML/DDL operations plus the functionality for establishing a connection and transaction management. In effect, for the client applications 57, 57n the Middleware 53 appears as an RDBMS with its own SQL API, e.g. a superset of the SQL API of one of the RDBMSs used in the replication, thus allowing for porting existing applications for work with an FT node 50 without modification.

The Diag API 55a provides for the interaction between the DivRep protocol module 54 and the Diagnostic module 55. Once a failure is detected by the DivRep protocol module 54, the Diagnostic module 55 is invoked to analyse the failed RDBMS (e.g. "rephrasing rules" [Gashi and Popov 2006] are one possible diagnosis mechanism).

The MC API 56a allows for the interaction between the DivRep Protocol module 54 and the Multicast Protocol module 56. The DivRep Protocol module 54 communicates the decisions reached about conflicting transactions inside the respective FT-node 50 to the Multicast Protocol module 56, which in turn ensures that these decisions are reconciled with the decisions from all other FT-nodes in the system. Once the decisions are reconciled, all the transactions are applied consistently on all FT-nodes. Besides guaranteeing data consistency across FT-nodes, the use of Multicast Protocol for FT-node replication increases the scalability of the overall system through the use of asymmetric processing (see Discussion of Prior Art and Appendix A). The particulars of the Multicast Protocol module 56, the associated MC API 56a, and the interaction between Multicast Protocol modules 58 across FT-nodes (represented with the dashed arrowed lines in FIG. 5) are not necessary for understanding the basic functionality of the FT-node and therefore are not discussed further here.

Figure 6:
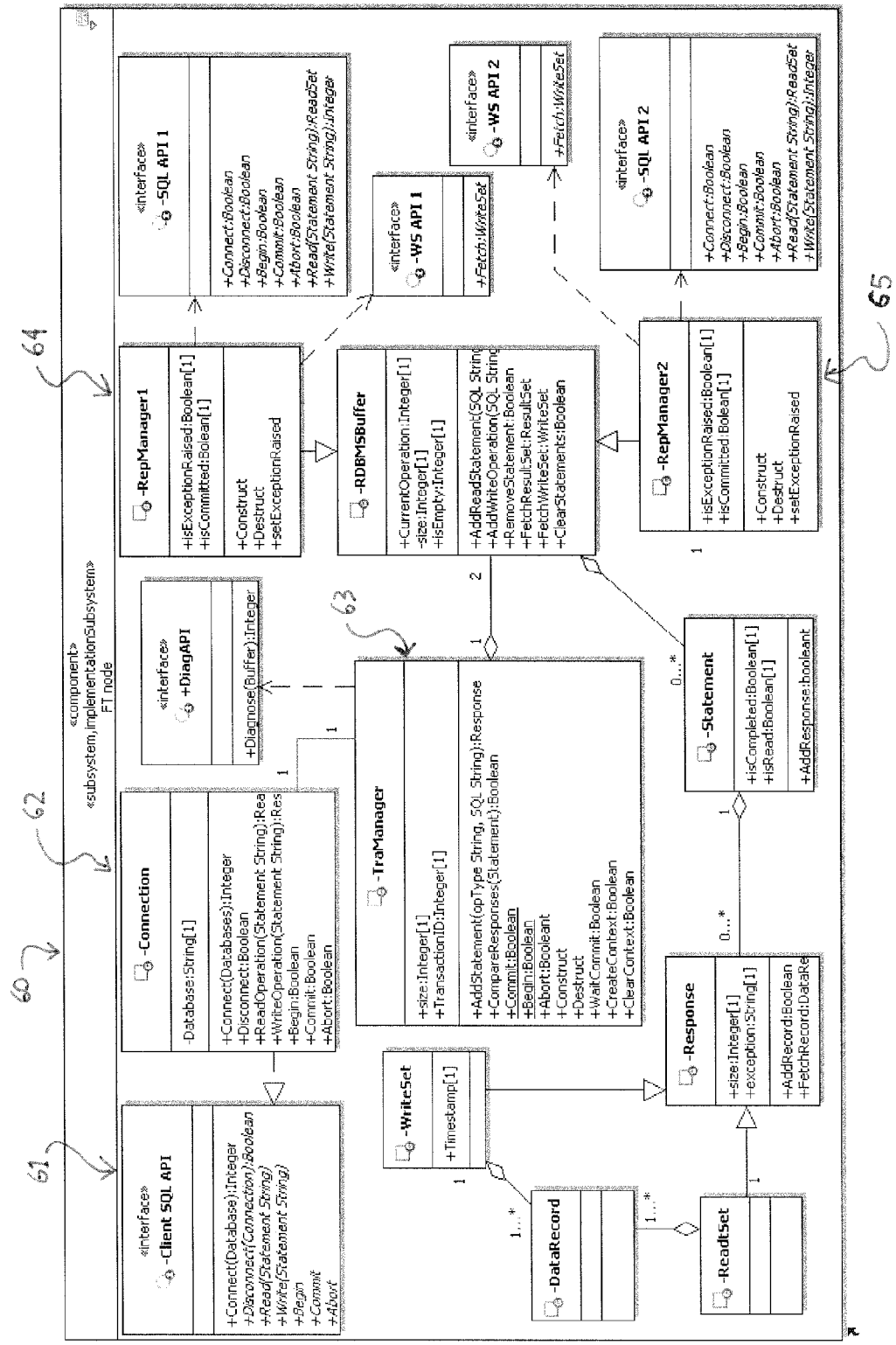
FIG. 6 illustrates a transaction context for the FT-node of FIG. 5 as a UML Class diagram.

FIG. 6 illustrates the contexts (i.e. the data structures) created within the Middleware component, which allow for a transaction originating from the particular client to be mapped into transactions with the RDBMS1 and RDBMS2. More specifically, FIG. 6 shows a UML class diagram illustrating the transaction context, maintained in the Middleware component for each transaction created by a client application.

An implicit assumption is made in the FIG. 6 that there will be a single transaction per connection (indicated by the 1-to-1 association between the classes Connection and TraManager), which simplifies the description of the embodiments of the present invention. Although such 1-to-1 mapping between connections and transactions is widely used in practice, in many cases multiple transactions can share the same connection, a case which would require a trivial extension of the diagram and the Client SQL API 61 to allow for the transaction ID to be used as a parameter in all Client SQL API operations.

Informally, the operation of the FT-node 60 can be described as follows. The client (e.g. a software application) first establishes a connection to a named database by sending a request via the Client SQL API 61 to the Middleware (Connect operation). A Connection object 62 is created, which in turn instantiates a TraManager object 63 and sets a transaction ID unique across all concurrent transactions. This object then instantiates a series of objects which would hold the operations, which make up the transaction (shown in the diagram as a UML composition with a Statement class) and the respective responses received from each of the RDBMSs on operations' completion. The responses are stored in instances of the class Response, which in turn may be either a ReadSet (in case a read operation is executed) or a WriteSet (in case a modifying operation is executed). Every response consists of a non-zero number of DataRecords. The class TraManager includes (modelled as a UML aggregation association) two dedicated classes (RepManager1 and RepManager2 both derived from the class RDBMSBuffer holding the operations as sent to and the responses returned by the respective RDBMSs. The communication of the Middleware with the RDBMSs is undertaken by the RepManager objects 64, 65, which use the interfaces as defined in FIG. 5 (SQL API and WS API associated with the respective RDBMS).

The instances of TraManager 63, RepManager1 64 and RepManager2 65 are run concurrently in separate execution threads. If multiple transactions are run concurrently, multiple instances of the classes shown above will be created in the Middleware component, one set of instances including the triplet of threads (TraManager 63, RepManager1 64 and RepManager2 65) per transaction. Due to multithreading so achieved, the middleware allows for concurrent execution of transactions.

A degree of synchronisation between the transactions is achieved at transaction "edges" (Begin and Commit/Abort operation): the Begin and Commit operations of a transaction are serialised (i.e. their executions are mutually exclusive (mutex) among TraManager objects). This is supported by defining the methods Begin and Commit in the TraManager class as static, as per UML specification. The protocol does not require a mutex for the Abort operations. This concurrency control can be developed further by executing several edges simultaneously (in 'epochs'), but this will be discussed below in consideration of variations to this embodiment.

The Client SQL API defines two "data" functions, Read (Statement String) and Write (Statement String), which allow for any DML operation to be submitted to the middleware; the latter function also allows for a DDL operation to be submitted. It should be noted that typically the DDL operations (e.g. an operation that modifies a database table structure) are not mixed with DML operations, but are instead executed in separate transactions. The Client SQL API defines also 3 transaction control operations—Begin, Abort and Commit.

When a data operation is submitted via the Client SQL API it is propagated to the respective buffers (RepManager1 and RepManager2) and explicitly stored in the Statement object with the attribute "isRead" set to "true" in the case of a ReadStatement operation. The TraManager object 63 serves as a gateway to pass the operations from the Client SQL API to the respective queues of operations maintained by RepManager1 64 and RepManager2 65 (in the respective Statement objects held in the RepManager objects). The actual processing of the operations from the queue is left to the RepManager objects 64, 65 (run in their own threads). The RepManager would pull from the queue one operation at a time and submit it for execution by the respective RDBMS via its SQL API. The RDBMS may either successfully complete the operation, in which case the RepManager will fetch the respective response (either via the SQL API in case of a read operation or via WS API in case of a write operation) and store these in the respective Response object associated with the successfully executed operation, or the RDBMS may fail to execute the operation successfully, in which case an exception will be returned to the RepManager. The TraManager object 63 will monitor the Response objects associated with the last submitted operation (using its attribute size, which indicates the number of operations in the transaction queue). Once a Response is received, the TraManager object 63 returns it to the client application. Note that the Response class has an attribute exception of type String. In the normal case this attribute will be set to an empty String.

In case of an exception being raised by the respective RDBMS (e.g. as a result of incorrect syntax of an SQL operation or a write-write conflict) the attribute will get set to a meaningful value, e.g. "Incorrect syntax". In this case, the response returned to the client application will return a Response object (e.g. a ReadSet object in case of a read operation), which will carry the exception raised. The TraManager can implement different modes of operation, which will affect the point in time when a response is returned to a client application. If the Middleware is configured to work in pessimistic mode, the response will be returned after both RepManager1 and RepManager2 have returned their responses, these have been adjudicated by the comparison (see the CompareResponses( ) function shown in FIG. 11 and described later) and no discrepancy has been detected. If instead the Middleware is configured to work in optimistic mode, as soon as a response is returned by either RepManager1 or RepManager2, it is returned to the client application. The adjudication on the two responses is applied when both become available. The client will be notified if a discrepancy is detected upon adjudication completion.

In case of an exception, the respective RepManager will set its Boolean attribute "isExceptionRaised" to "true" and stop pulling operations from its queue, even if more operations are waiting to be processed.

The TraManager class contains a function called CompareResponses, which is activated when responses (Response objects) from both RDBMSs to the same statement are collected. This operation returns "true", if the responses are identical and "false", if the responses differ. In the latter case (non-identical responses), the TraManager object 63 would access the operation Diagnose( ) of the DiagAPI interface for diagnosing which of RDBMS 1 and RDBMS 2 has failed. Details of the diagnosis are beyond the scope of the present embodiment, but it is envisaged that a solution based on 'rephrasing rules' [Gashi and Popov 2006] is possible. If the diagnosis is successful, the operation Diagnose( ) will return the ID of the RDBMS, which has been identified to have failed (e.g. 1 for RDBMS 1 and 2 for RDBMS 2, 3 for both failing and 0—if the diagnosis failed). The diagnosis outcome may be interpreted in different ways (the variations are scrutinised further below). For instance, a successful diagnosis may lead to blocking the operation of the failed RDBMS from further processing (i.e. reducing the FT node to a single RDBMS). Unsuccessful diagnosis may lead to fail-stopping the FT-node, i.e. all connections are abnormally closed by the middleware as if the FT-node has crashed.

A further variation of the CompareResponses( ) operation is setting a timeout (not shown) for the responses to be collected. If the timeout is exceeded it will serve as a trigger for diagnosing the RDBMS, which failed to provide a response. Such timeouts provide a mechanism for detecting crash failures of the RDBMSs and faults in the Middleware implementation, which would lead to failing to collect a response from the respective RDBMS.

The TraManager object 63 will also monitor whether either RepManager1 64 or RepManager2 65 have received exceptions from the respective RDBMS (e.g. NOWAIT exception defined above or other such as a deadlock (see Appendix A for explanation) between concurrent transactions, etc.). If this is detected, then the TraManager will abort the transactions on both servers, using the Abort operations of the respective SQL API. In contrast with the Begin/Commit operations the Abort operations do not have to be synchronised with the operation "edges" of the other transactions (i.e. their respective TraManager objects).

When a Commit operation is submitted via the Client SQL API, the Connection passes it on to the WaitCommit( ) operation of the TraManager object, which will wait until both RepManagers have processed in full their respective queues of operations and then will enter the static method (i.e. the mutex) Commit( ) of the TraManager for committing the transactions on RDBMSs (by invoking the Commit( ) operation of the SQL APIs).

The interactions summarised above will now be described in further detail with reference to standard UML sequence diagrams.

Figure 7:
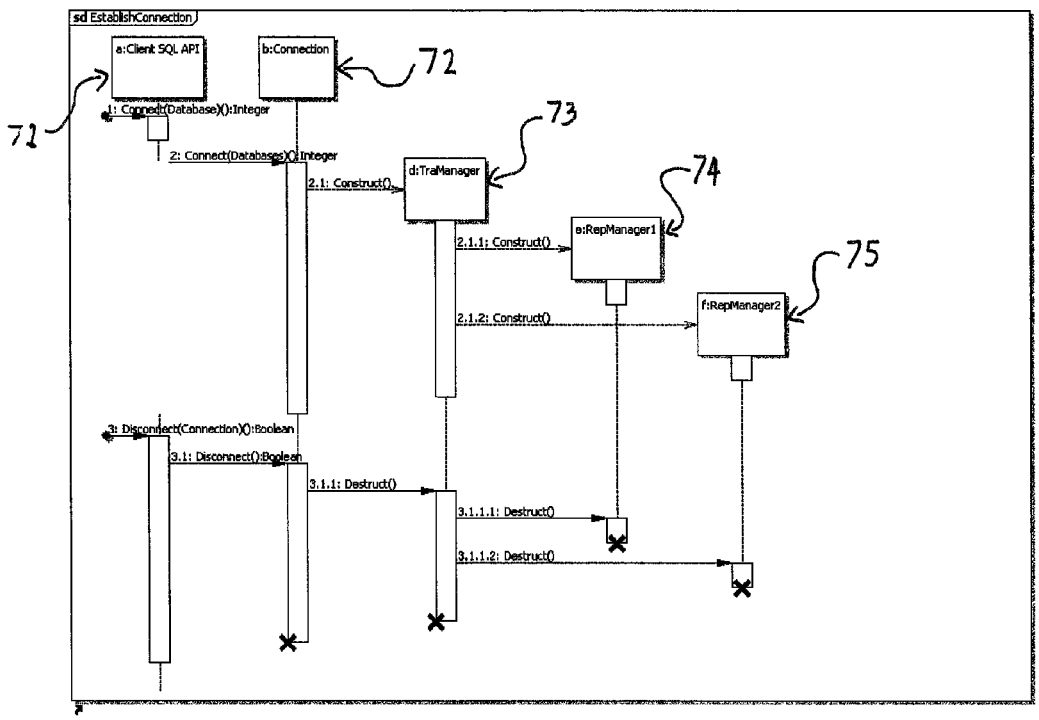
FIG. 7 illustrates the establishment and destruction of a connection associated with a transaction in the FT-node of FIG. 5.

FIG. 7 illustrates a typical interaction of establishing a connection, in which the objects associated with a transaction are created. The details related to instantiating and destruction of the RepManager object parts—the queues of Statement/Response, have been omitted for ease of understanding. The objects and the invocation of their respective methods (shown as messages) are displayed in the diagram. More specifically, FIG. 7 is a UML sequence diagram related to establishing and destroying a connection between an external agent (application software) and the Middleware. The upper half of the diagram shows establishing a connection, while the lower part closing a connection, As a result of closing a connection the objects are destroyed (indicated by the crosses at the bottom of the vertical bars (UML's lifelines) showing the lifecycle of the respective objects).

Figure 8:
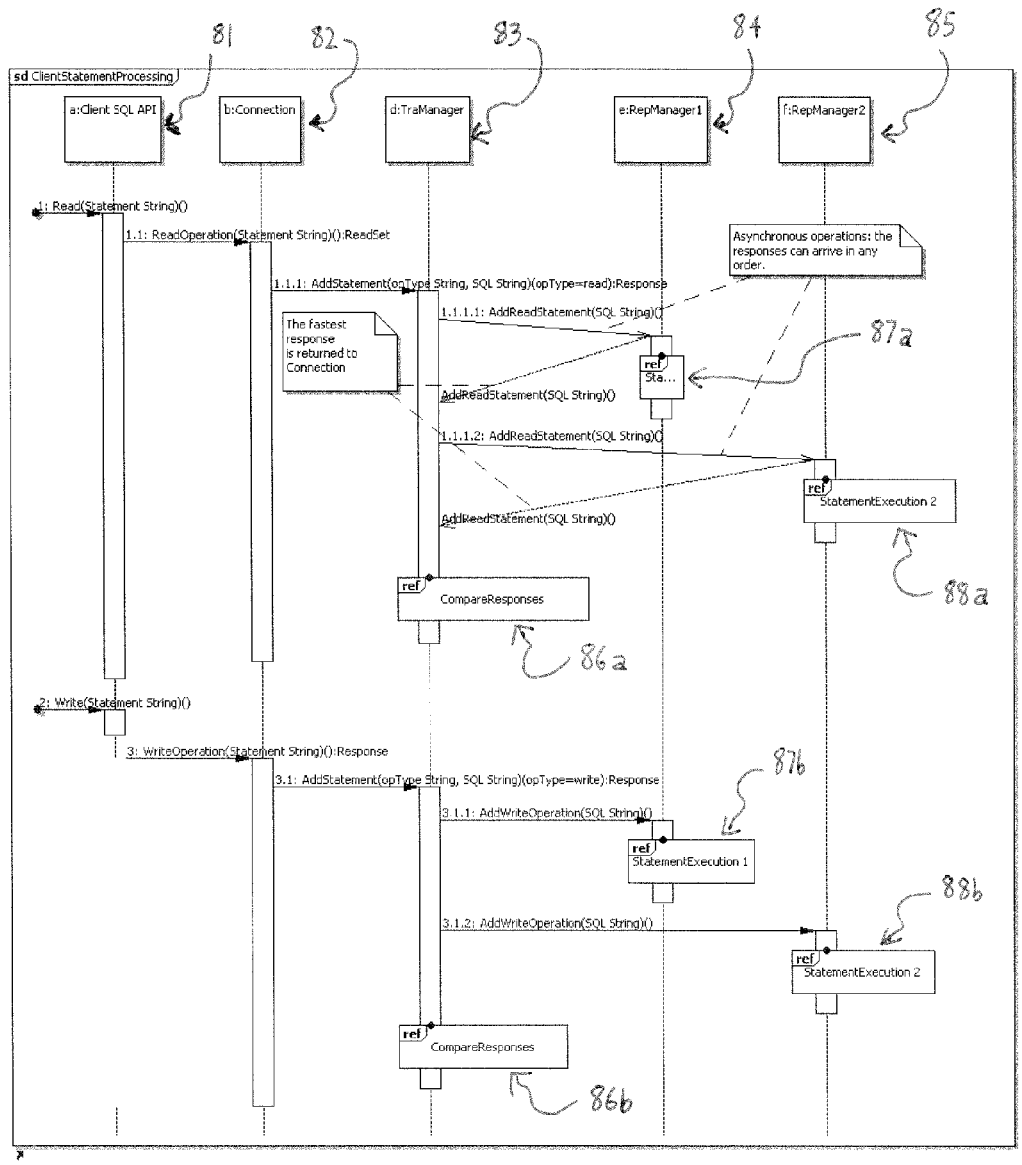
FIG. 8 illustrates the interaction related to the processing of an operation by the FT-node of FIG. 5.

FIG. 8 shows the interaction related to processing an operation by the FT node, focussing on how the operations submitted for execution by client applications get stored in the respective queues of RepManager objects 84, 85. More specifically, FIG. 8 is a sequence diagram showing how a DML statement (a read or a write operation) gets placed in the RepManager queues for passing to the RDBMSs for further execution. The upper part of the figure represents the read operation and the lower part the write operation.

Figure 9:
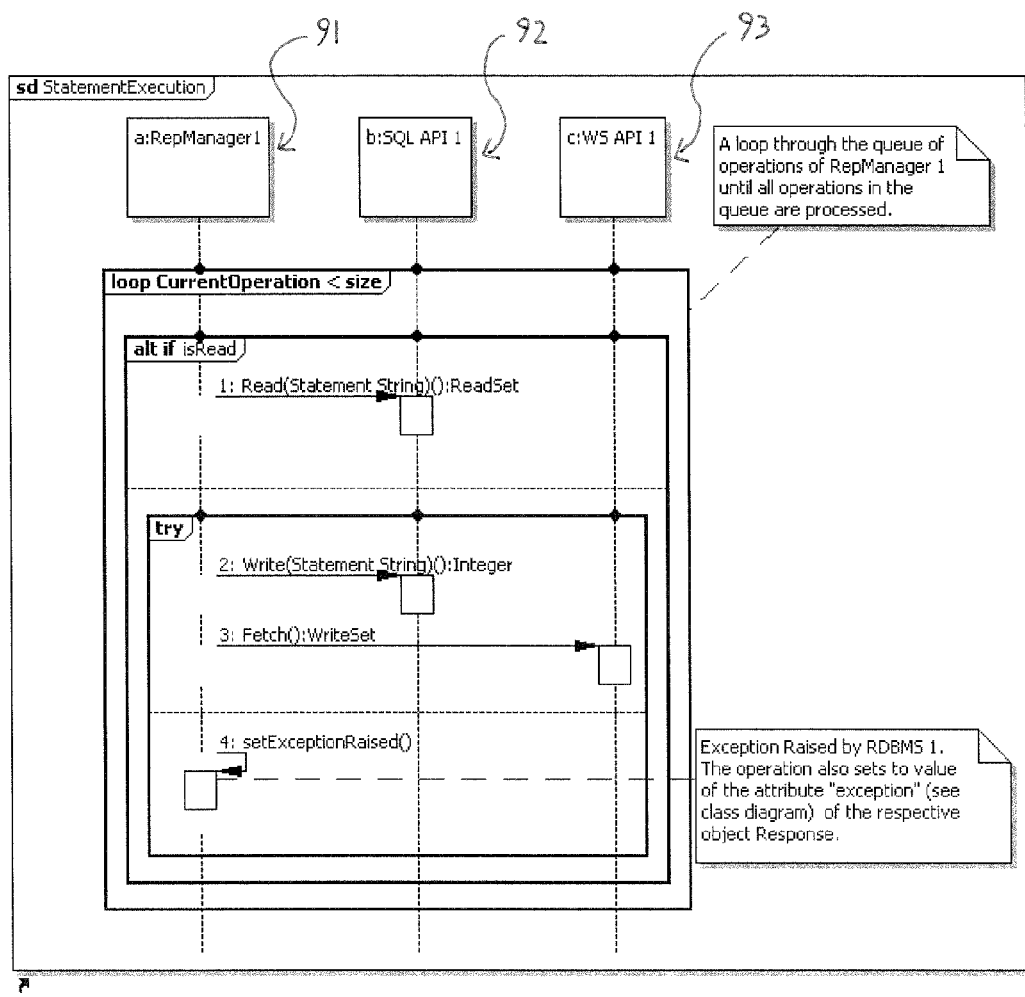
FIG. 9 shows the interaction between a RepManager object and respective RDBMSs in the FT-node of FIG. 5.

The fragments 87a, 87b, 88a, 88b (procedures) with the tag ref StatementExecution 1 and StatementExecution 2 shown in FIG. 8 are described in greater detail in FIG. 9, which details how an operation in the RepManager queues gets passed on for processing by the RDBMSs. Similarly, CompareResponses procedure 86a, 86b is described in greater detail in FIG. 11.

FIG. 9 is a UML sequence diagram, which shows the interaction between the RepManager object 91 and the respective RDBMSs. Depending on the type of operation upon its completion either a ReadSet gets returned to the RepManager or a WriteSet gets fetched by the RepManager from the WS API 93. In addition, for a write operation it is shown explicitly (in the try fragment) the possibility for an exception to be raised by the server (e.g. a NOWAIT exception), which if observed would lead to setting to "true" the isExceptionRaised flag (attribute) of the respective RepManager.

In FIG. 9, the detailed interaction between the RepManager object with its parts, the Response object and of the Response object with its parts (the DataRecord object(s)), for storing the data returned as a result of executing the operation, have been omitted as these are mere details of how the innovation can be implemented, which would be within the knowledge and capability of the skilled addressee.

Figure 10:
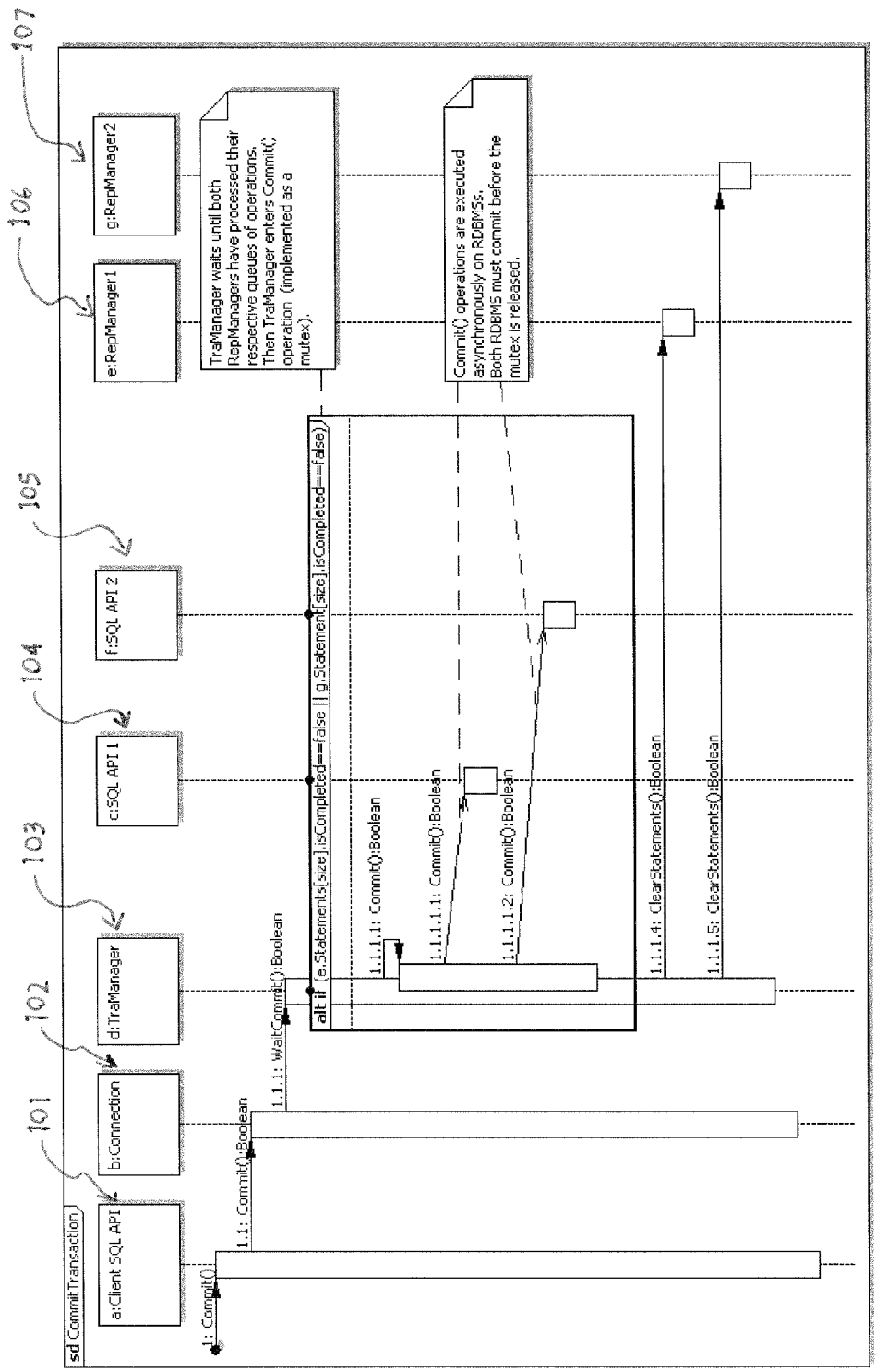
FIG. 10 shows a UML sequence diagram of committing a transaction in the FT-node of FIG. 5.

FIG. 10 shows a UML sequence diagram of committing a transaction. A Commit operation gets submitted by an agent, which then gets relayed to the TraManager object 103 (its WaitCommit( ) operation). The TraManager 103 waits until both its RepManagers objects 106, 107 have processed in full their respective queues, upon which enters its own static (mutex) operation Commit( ) within which Commit( ) is submitted to both RDBMSs. At this stage, the databases are modified (a Write operation carried out only on the extracted writeset is now applied to the actual database from which it was extracted). SQL API Commits are invoked concurrently and TraManager object 103 waits for commits to complete by both RDBMSs, and RepManager queues are cleared by the ClearStatements operations 108 (the fragment (procedure) at the bottom of FIG. 10.).

Invoking the SQL API Commits are shown as asynchronous operations. However, TraManager object 103 does wait for the commit to complete—successful completion of both commits is needed for the RepManager queues to be cleared by the ClearStatements operations 108 (the fragment (procedure) at the bottom of FIG. 10.)

An important feature of the present embodiment is that the responses of the replicas are compared, which offers ways of detecting non-crash failures (discrepancy of the results obtained from RDBMSs). The interaction between objects related to comparison is shown in FIG. 11 and described below.

Figure 11:
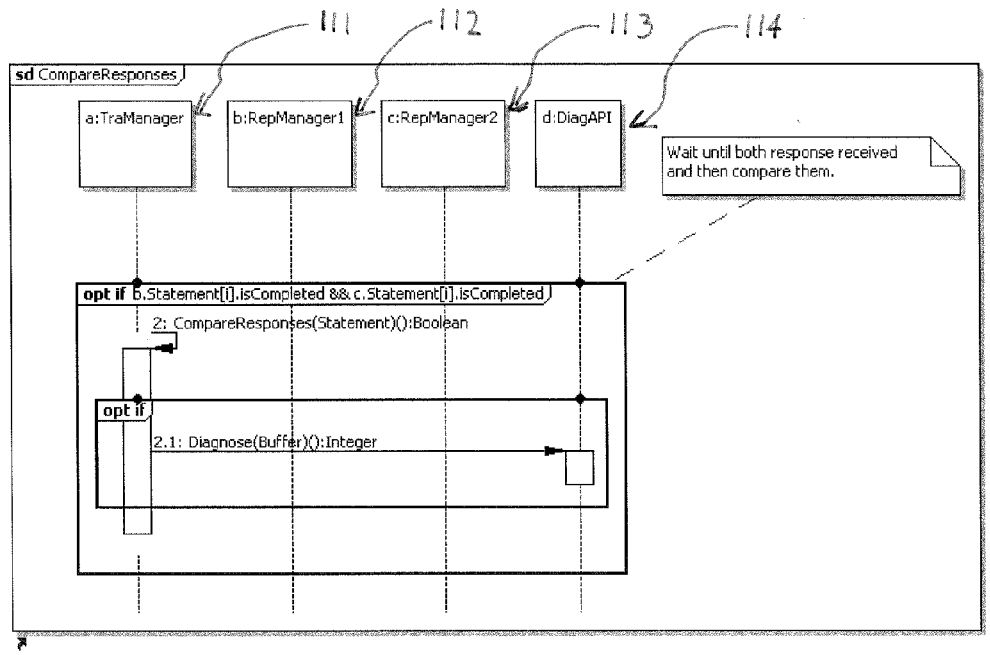
FIG. 11 shows interaction related to the comparison of responses received from RDBMSs in the FT-node of FIG. 5.

FIG. 11 is a sequence diagram showing the interaction related to comparison of the Responses from the RDBMSs. The comparison is carried out once the responses from both RDBMSs to the same operation have been received (the TraManager object 111 monitors the value of the attribute isCompleted of the same operation in both RepManager1 112 and RepManager2 113) and when both are set to "true" the operation CompareResponses( ) as shown in FIGS. 6 and 8 of the TraManager object is invoked. In the case a discrepancy is detected, the TraManager object 111 invokes the operation Diagnose( ) of the Diag API 114 (part of the Diagnostic module as shown in FIG. 6. It is to be noted that the "membership" of the attribute isCompleted in the respective RepManagers is implicit from the diagram in FIG. 6. The semantics of the part of the UML diagram consisting of Statement, RDBMSBuffer and RepManagers is as follows: every object of the class RDBMSBuffer consists of, among other attributes, a number of Statement objects (possibly zero). The classes RepManager1 and RepManager2 are specialisations ("subclasses") of the general class RDBMSBuffer, and as such they inherit all the attributes that the general class contains. Thus, they each contain (the reference to) the isCompleted attribute of every respective Statement object.

The interaction beyond invoking the Diagnose( ) operation is not discussed further here, but is discussed further below when variations to this embodiment are considered.

Figure 12:
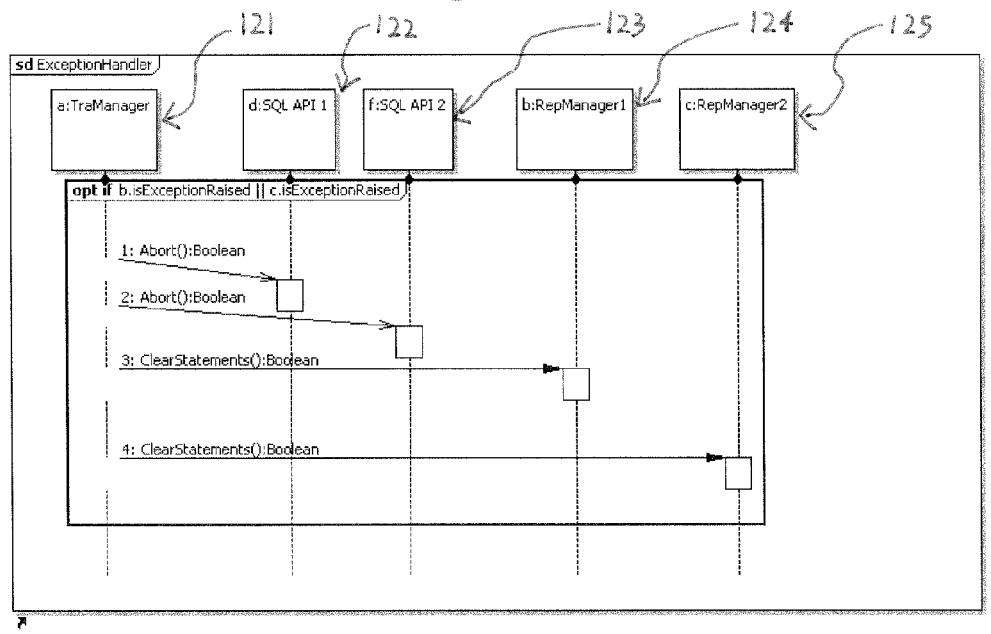
FIG. 12 shows a procedure of exception handling by middleware in the FT-node of FIG. 5.

FIG. 12 shows the procedure of exception handling by the Middleware. More specifically, FIG. 12 shows a UML sequence diagram of an exception handler used in the DivRep replication protocol. The operations Abort( ) are executed concurrently, TraManager waits until the aborts are completed by the respective RDBMSs.

The logic presented here is minimalistic—any exception raised by either RDBMS 1 or RDBMS 2 leads to aborting the transactions on both RDBMSs. Although more refined algorithms of exception handling are possible, the one presented here is sufficient for achieving consistent operation on both RDBMSs.

A formal description of the operation of DivRep is provided, by supplying a pseudo-code of the replication protocol used by the DivRep module. This pseudo-code is shown in FIGS. 13 and 14, and is discussed with reference to these Figures below.

As mentioned in the previous section, the DivRep module executes on Transaction Managers (referred to as TraManagers, see pseudo code shown in FIG. 13, which illustrates the execution of the DivRep protocol on a TraManager)—there is one TraManager serving each client, as well as on Replication Managers (referred to as RepManager, see pseudo code shown in FIG. 14, which illustrates the execution of the DivRep protocol on a RepManager)—there are n RepManagers per each TraManager, where n is the number of RDBMSs deployed in an FT-node (n=2 in the embodiment described above but can be any integer greater than 1. The execution of this embodiment of the replication protocol (FIGS. 13 and 14) assumes that every transaction submitted by a client consists of a transaction begin operation, a non-zero number of read or write operations (a write operation is either a DML or DDL operation) and finishes with a commit or an abort operation.

In this embodiment of the replication protocol, the following features have been set to enable successful execution of the replication protocol:

One of the replicas is configured with NOWAIT exception parameter enabled. The other replicas are configured with NOWAIT exception disabled (the importance of this is described below).

The TraManager is instantiated; a connection exists between the client executing a transaction and the TraManager object.

It is assumed that every client is "well-behaved" in that it submits operations with clearly defined transaction boundaries: each transaction starts with a begin operation, followed by a number of reads and writes and in the end it either commits or aborts.

Crashes of replicas are detected by putting timeouts in RepManagers, on any of the read or write operations. If timeouts occur they will result in the expected responses being set to represent exceptions by the RepManagers. Similarly, for the commits and aborts timeouts are set up by the TraManagers.

A TraManager accepts transaction operations submitted by a particular client. It deals in a specific way with every operation depending on its type, e.g. transaction boundary operations (begins, aborts and commits) are treated differently than the read and write operations. If an exception occurs during the processing of a transaction, TraManager notifies the client after indicating that the transaction needs to abort (set transaction to abort). As a result, the Abort function is triggered—the function submits aborts to all RDBMSs (abort operation for each RDBMS is executed in a separate thread) through the respective SQL API without sending them first to the RepManagers.

The execution of a begin operation includes the following steps: first, the variable indicating that a particular transaction should abort is reset, i.e. its value is set to false; then the global mutex, contended for by all TraManagers, is acquired; the begin operation is sent to all RDBMSs for transaction snapshots to be created—this is done directly through each replica's SQL API, without sending it first to RepManagers. No commit or begin operation can execute unless the TraManager holds the mutex, and thus consistent snapshots (unchanged by any other transaction commit) are taken on all replicas; the global mutex is released; and finally the control is returned to the client. If at any time during the processing of the begin operation an exception is raised, the transaction abort is flagged, which subsequently will trigger the Abort function.

The execution of a read or a write operation is treated in the same way in TraManager. First, the operation is placed in the queues of all RepManagers. Once the fastest response is received (i.e. an RDBMS has successfully executed the operation passed to it by the respective RepManager), it is returned to the client. If an exception is received, however, the transaction is set to abort, triggering the Abort function. Without occurrence of an exception, the processing continues by TraManager waiting for the responses from all RDBMSs. Once all of them are collected, the Comparator function is initiated. Similarly to Abort function, the Comparator executes asynchronously with TraManager and the respective RepManagers. It compares the corresponding responses from all RDBMSs and if it finds a mismatch between results the transaction abort is set, indicating to the client that "data inconsistency" exception has occurred.

If the client submits an abort operation, the TraManager triggers the Abort function by setting transaction abort.

Once the commit operation is submitted, the TraManager checks if a transaction abort has been already set. If it has not, once the votes from all replicas (confirming that all reads and writes have finished) and the Comparator vote (confirming no result mismatch was found) are collected, the mutex is acquired. Similarly to the execution of the begin operation, no commit or begin from other transactions can execute while the TraManager holds the mutex. This guarantees that the order of the commits and begins is the same on all replicas. After all replicas have acknowledged that the commit has been executed, the mutex is released. The queues of the RepManagers are then cleared, preparing them for the execution of the following transaction, and the control is returned to the client.

Figure 3:
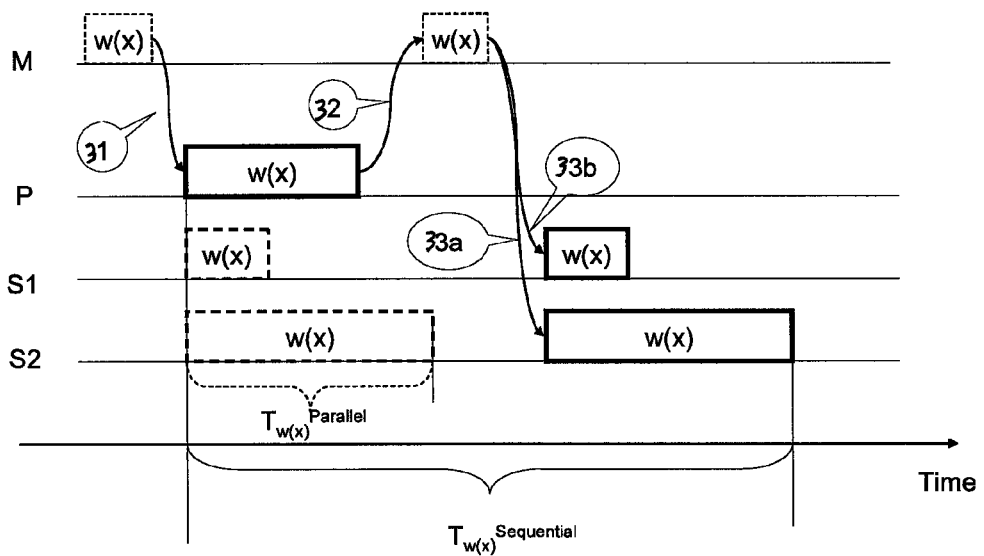
FIG. 3 shows a timing diagram of the execution of a write operation in the prior art HRDB scheme.
Figure 4:
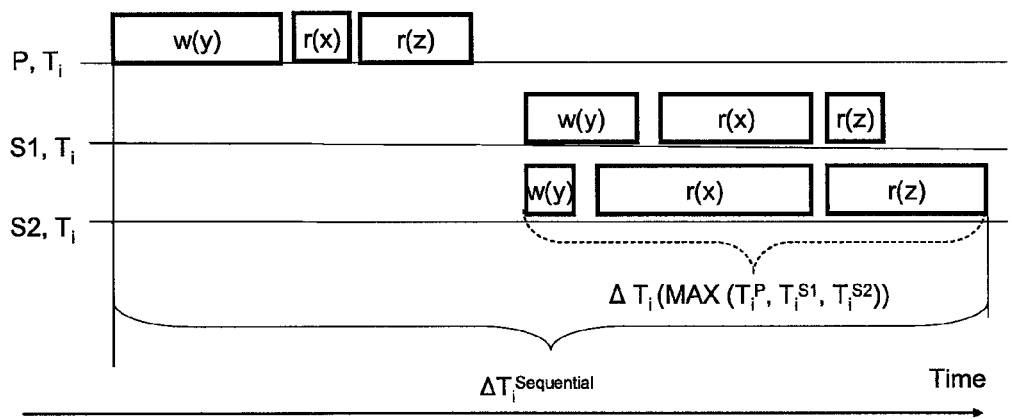
FIG. 4 shows a timing diagram of executing a transaction with one write and two read operations on three replicas in a prior art Byzantium scheme.

FIG. 15 shows a timing diagram of the execution of transaction $T_i$ using DivRep protocol as described in FIG. 13. The Middleware (M) sends 151a, 151b the operations ($op_1, \ldots op_n$) to the two replicas (S1 and S2) as they arrive from the client application (to preserve the clarity of the figure, middleware M is depicted as sending all the operations in a batch to the replicas; in DivRep, instead, the middleware sends operations successively, as soon as they are received from the client). The execution of the operations takes place in parallel on the two replicas, and thus the response time ($\Delta T_i^{Parallel}$) of $T_i$ is, in general case, shorter then if HRDB (see FIG. 3) or Byzantium approach (see FIG. 4) was used. The transaction duration is likely to be prolonged due to the use of the Comparator Function (this detail is not shown in FIG. 15). The actual delay is, however, likely to be minimal because the results' comparison in DivRep is performed in parallel with the operations' executions on the replicas (assuming the protocol is configured in the optimistic regime as described above), and thus all but the result of the last operation ($op_n$) might have been compared before the slower server completes all operations. The assumption of the minimal delay is, of course, dependant on the performance characteristics of the Comparator Function and the sizes of the results to be compared. Note that the only two, "peer" replicas are shown to be executing the transaction in DivRep—no notion of the local, i.e. primary replica, exists as is the case in HRDB and Byzantium.

The part of the DivRep protocol executed on RepManagers (shown in FIG. 14) is simpler than the execution on the TraManagers—Replica Managers execute only read and write operations. As long as there are unexecuted operations in a particular RepManager queue and the corresponding transaction is not set to abort, the processing proceeds as follows. If it is a read operation, the operation is sent to the RDBMS, the response (either data or the exception due to unsuccessful execution) is fetched and returned to the TraManager. The processing of the write operation differs from the processing of a read in that RepManager has to explicitly initiate the extraction of the WriteSet. The WriteSet, identically to the result of a read operation, is sent to the Comparator function of the TraManager for validation.

Going back to the configuration of the system prior to execution of the DivRep protocol, the asymmetric configuration of the replicas (one is configured with a NOWAIT exception enabled while all other replicas have a NOWAIT exception disabled) is important. This embodiment uses a NOWAIT exception feature as a mechanism of immediate reporting the write-write conflicts by one of the RDBMSs, not both. Thus write-write conflicts will typically be reported by a single replica while on the other replicas, transaction blocking will take place in case of write-write conflicts. The exception handler, provided for NOWAIT exceptions, implements for one of the replicas a mechanism, which resolves consistently the consequences of non-determinism between RDBMS 1 and RDBMS 2.

Had both replicas been allowed to report immediately a write-write conflict would have led to unnecessarily high abort rate. For instance, had both RDBMS 1 and RDBMS 2 used NOWAIT any race between two transactions, which without NOWAIT would have led to a deadlock (see Appendix A) might have led to NOWAIT exceptions being raised against both transactions. Typically, this would have led to aborting both transactions by the DivRep protocol, while aborting only one would have sufficed and the second transaction could have proceeded.

Furthermore, the hierarchical data structure used to implement the DivRep protocol is important and advantageous. The above-described embodiment specifically shows how the responsibilities for the different operations (data manipulation vs. transaction control) are handled by a transaction manager thread (TraManager) and the replica management threads (RepManager). The embodiment also describes how once the state of a transaction is set to abort, the transaction manager (TraManager) will efficiently block any further operations waiting in the RepManager queues of the replica managers, thereby leading to fast response times once an abort condition is detected.

One further important characteristic of the present embodiment relates to the functionality between the client and the middleware application. The DivRep replication protocol described above communicates exceptions from Middleware to the client applications as they occur, and thus client applications respond faster to a situation when transaction aborts occur. This communication is important because the client application needs to be aware as soon as possible that a transaction cannot be committed. Without this communication, the unnecessary processing of the client application would likely lead to more read or write operations being sent to the middleware before the transaction is eventually aborted.

The embodiment described above will now be compared with solutions based on other approaches.

There are various solutions based on the 'read once write all available' (ROWAA) approach, which include the solutions for snapshot isolation based on reliable multicast. Unlike these solutions, the embodiment described above provides a defence against a class of failures wider than the crash failures targeted by the ROWAA solutions. As FIG. 16 clearly shows, the ROWAA solutions execute the read statements on a single replica and assume that if a response is received from the replica it is correct. As empirical studies indicate, such an assumption is unjustifiable. With respect to the write operations, although in ROWAA solutions the modifying operations are applied to all replicas, their correctness is not adjudicated beyond the assumed crash failure model.

Figure 16:
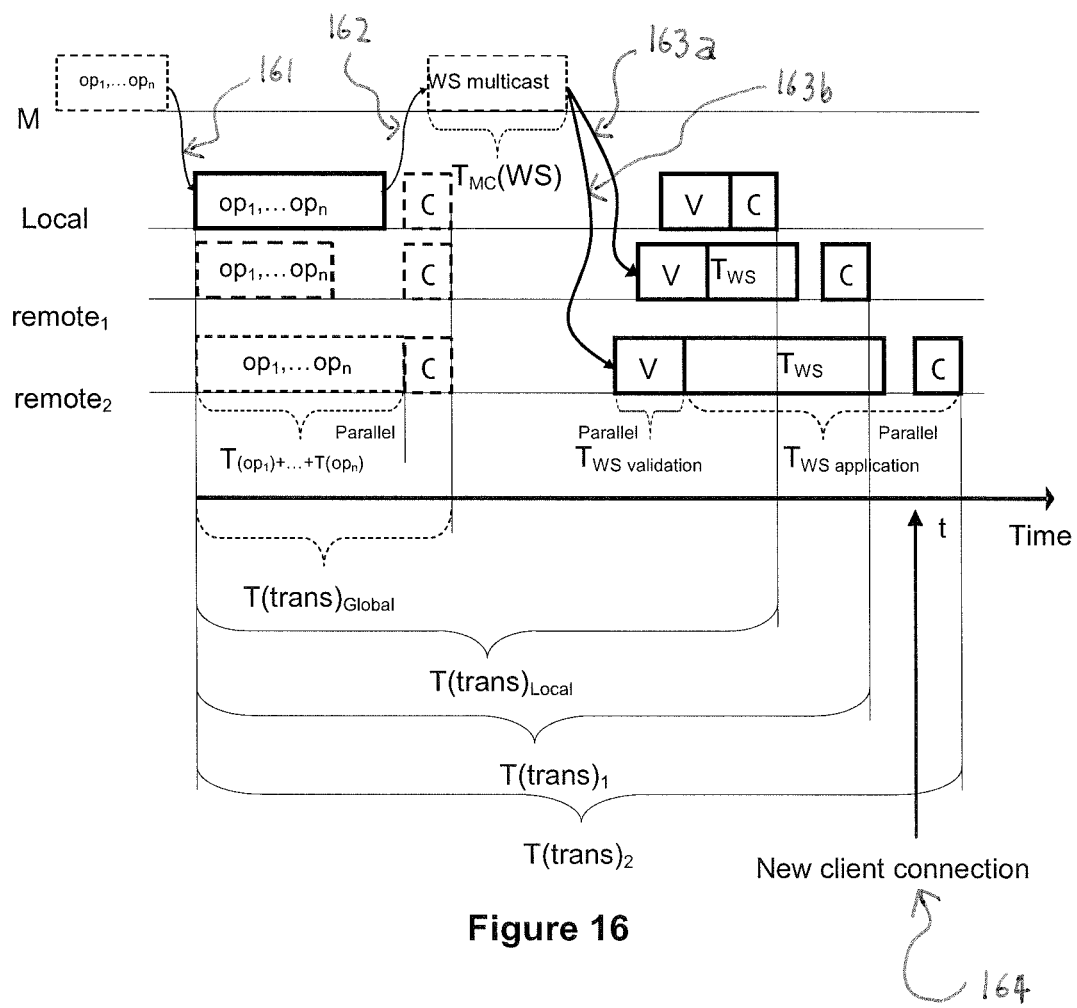
FIG. 16 shows a timing diagram of a conventional ROWAA scheme for snapshot isolation replication based on reliable multicast.

Referring to FIG. 16 in greater detail, a timing diagram of a typical ROWAA for snapshot isolation replication based on reliable multicast, is shown. The transaction execution time consists of 4 parts: the time it takes the local transaction to complete all operations of the transaction, $T(op_1, \ldots op_n)$, the time for the middleware to multicast the write sets (WS) accumulated by the local replicas, $T_{MC}(WS)$, the time it takes the remote replicas to validate the WS, $T_{WS\ validation}$ and the time it takes the remote replicas to apply the WS, $T_{WS\ application}$.

In contrast, DivRep of the embodiment described above offers a comparator function, CompareResponses( ), which allows for any discrepancies between the responses to be detected and acted upon. If at least one replica works correctly, and the diagnosis is successful some failures may be masked. If diagnosis is not successful (it is unclear if there is a correct replica), the middleware may at least detect a problem, and as a minimum may record it, or preferably will report to the client application that the FT-node failed to complete the operation.

The solutions with snapshot isolation surveyed in the section 'Prior Art' deal with write sets in a different way from the DivRep protocol described above. The known solutions for databases with support for snapshot isolation based on reliable multicast (e.g. Middle-R, [Patino-Martinez, Jimenez-Peris et al. 2005]) minimise the number of messages exchanged between the replicas by exchanging the write sets of the transactions as a single message. The replica designated to serve as a "local" replica, collects the write sets produced by the modifying operations of the transaction and propagates them when the local replica is ready to commit.

Figure 1:
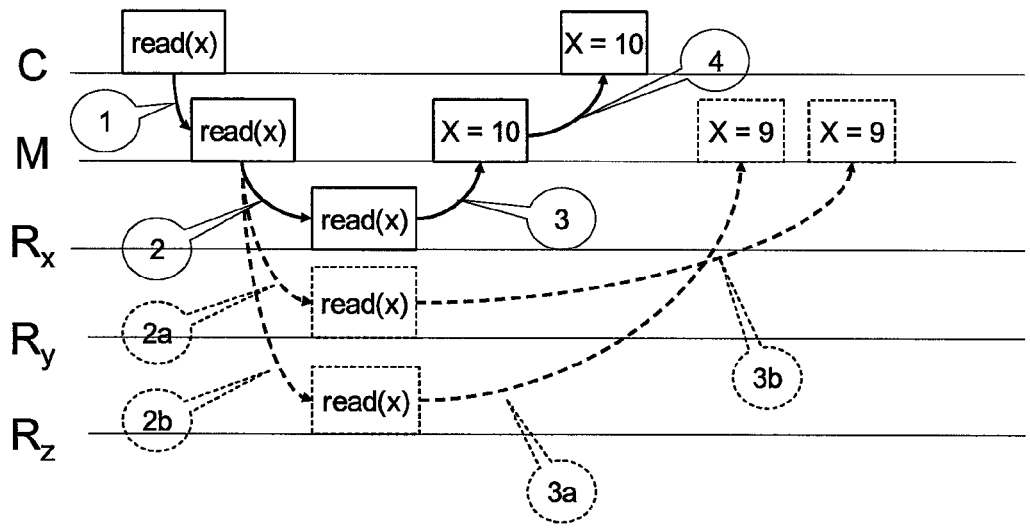
FIG. 1 illustrates a generic middleware-based database replication protocol using asymmetric transaction execution and demonstrates the impossibility of incorrect result detection in such systems.
Figure 2:
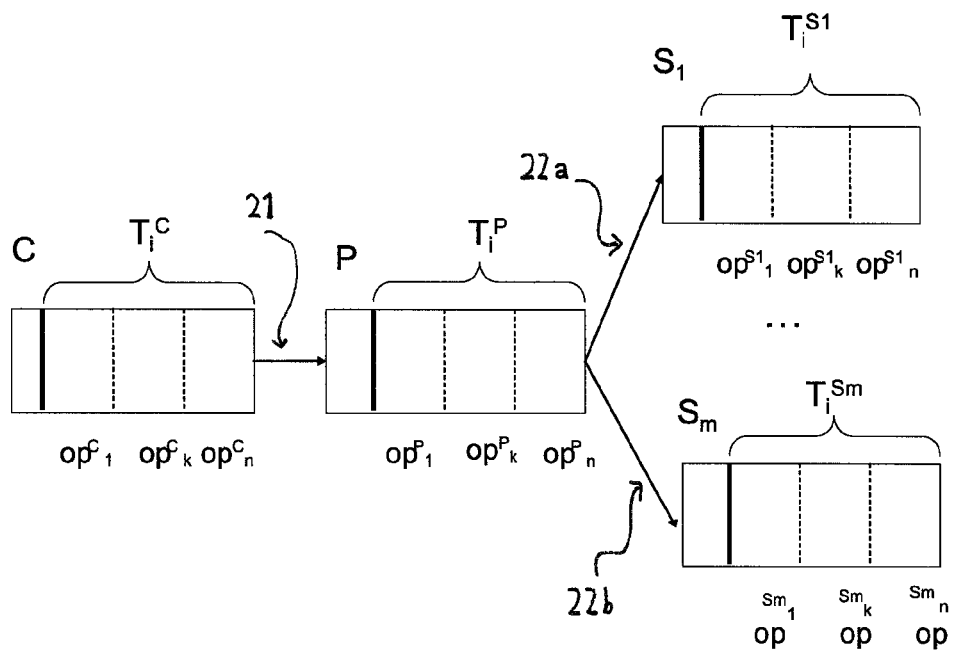
FIG. 2 illustrates a generic primary/secondary approach to database replication.

In effect, this prior art method is a specific implementation of the Primary/Secondary scheme, in which there are two distinct parts in the processing of each transaction as shown in FIG. 2. The "local" replica executes the transaction in full, while the other replicas process only the WriteSet multicast by the "local" replica. In contrast with the standard primary/secondary arrangement, solutions similar to Middle-R require a "validation" phase by all the replicas of the write sets being multicast, the implementation of which is not defined in sufficient detail to allow for any educated guess on how expensive this validation can be in comparison with the cost of multicasting a message. In any case, the transaction duration with multicast is likely to be longer than if the transactions were executed in parallel.

Note that in multicast-based solutions the replicas will complete the transactions at different times and, if a new client connects to the replicated database, the data that this client will 'see' (via the snapshot of the database it will take) depends on which replica it is connected to. In the example case shown in FIG. 16, a new client connected 164 at time t to either the "local" or "remote$_1$" replica will see the effects from the transaction detailed in the diagram. If the client, however, connects to replica "remote$_2$" it will not see the effect of the transaction, since this transaction is yet to be committed. This 'feature' may seem insignificant—after all the client will never interact with more than one replica. In some extreme scenarios, however, e.g. as a result of using a pool of connections, the client may end up being connected to different replicas for successive transactions. Then this client may be affected by the phenomenon identified above: the transactions which this client successfully committed on the initial local replica (initial local replica transactions) may be still in progress by the replica to which this client has been connected for the subsequent transactions (subsequent local replica transactions). As a result, the client may be unable to 'see' the data that the transactions (i.e. the initial local replica transactions) have written to the database—this could happen not because the data have been changed by another transaction, but simply due to the particular way the multicast-based replication protocol is optimised. In contrast, DivRep protocol of the present invention does not suffer from a similar deficiency. Since the transaction edges are processed in atomic operations, the creation of a new snapshot is impossible until all previous transactions have been committed on all replicas.

As indicated above, HRDB and Byzantium also possess protocols which use diverse replicas. Differences between the embodiment described above, with its DivRep protocol, and these schemes and their protocols are considered below. In all three cases concern is given to the effects of non-crash failures of the RDBMSs. The failure models used by the other schemes, however, are different. HRDB and Byzantium target the so called Byzantine failures—the most general known type of misbehaviour in distributed systems, an example of which are replicated databases.

In the protocol of the embodiment described above failures are targeted, for the existence of which there is empirical evidence: significant proportion of failures observed with several RDBMSs summarised in the section Prior Art are non-crash failures. More importantly, the empirical studies show that using diverse (heterogeneous) RDBMSs makes detecting such failures very likely. Although these failures nominally can be called Byzantine failures (any failure is a special case of Byzantine failure), they fall short of malicious behaviour such as sending different messages to different participants in a distributed system, a unique characteristic of Byzantine failures. It is the malicious aspect of Byzantine failures (behaviour) that makes Byzantine failure very expensive to tolerate. Opting for tolerating Byzantine failures may seem an advantage, but it has its cost. Unless there is evidence that Byzantine failures are a likely problem, tolerating them may be an expensive and unnecessary luxury. Byzantine behaviour is inherent in some cases of distributed systems (e.g. the behaviour of a sensor read by distributed applications may be adequately modelled as Byzantine behaviour). However, there is no empirical evidence of such behaviour for RDBMSs. For RDBMSs with snapshot isolation, there is no obvious mechanism to promote Byzantine failures: once a snapshot is taken the data remains stable until another snapshot is taken. The proposers of HRDB and Byzantium justify the decision to use the Byzantine failure model with evidence that crash failure model is implausible.

The cost of tolerating Byzantine behaviour is high. HRDB and Byzantium introduce a degree of redundancy required for a Byzantine agreement to become possible—at least 4 participants (3 replicas+a coordinator middleware) sufficient to tolerate a single Byzantine fault. In the absence of empirical evidence that the Byzantine behaviour may occur, solutions tolerating such behaviour can be seen as unnecessary 'expensive'.

Instead the DivRep protocol set out for the embodiment above takes a more "economical" approach and requires 2 RDBMS+a replication middleware, sufficient to detect a single failure. In fact, the DivRep protocol of the embodiment described would tolerate non-crash failures of one of the used RDBMSs. As far as the Middleware is concerned, it is assumed to be free of design faults (i.e. is correct by design) and for it, a crash failure model is sufficient (similar to the assumption made by HRDB for the respective middleware, referred to as Coordinator). This assumption is plausible, as the protocol is relatively simple and its correctness can be proven formally.

In the embodiment described, if the middleware crashes then the entire FT-node becomes unavailable. The person skilled in the art would be able to provide an appropriate solution to enable alternative resources in the event of such a failure—one such approach would be to use a standard 'failover' solution (e.g. as in passive replication using a primary-backup, also called leader-follower, scheme [Mullender 1993]) sufficient for tolerating crash failures.

The differences between HRDB and the DivRep protocol of the embodiment set out above have been outlined previously. Both HRDB and Byzantium use a variant of the Primary/Secondary scheme (see FIGS. 2 and 3). As a result, the transaction is prolonged by serial execution of operations on the primary and the secondaries. The scheme avoids non-determinism between the primary and the secondary replicas, but in cases with high likelihood of write-write conflicts, the longer the transactions the greater the chance of a conflict on the primary, i.e. high abort rate. In the cases when the likelihood of write-write conflicts is low, avoiding non-determinism with the use of primary/secondary scheme brings very little to no advantage but incurs a significant increase of the response time. Indeed, in the extreme case of no write-write conflicts non-determinism in the replicas configured with snapshot isolation has no effect on concurrency control. Thus with such workload of operations serialising the execution of the (write) operations on the primary and the secondaries is not necessary, and so the performance overhead is not justified.

In the DivRep protocol described above the operations are executed in parallel on all replicas—in the version described, the protocol is optimistic in the sense that it assumes implicitly that there will be no write-write conflicts between the transactions. Therefore, if indeed the write-write conflicts are infrequent in the workload, the DivRep protocol described above would offer better performance than HRDB. If write-write conflicts do occur, non-determinism between the replicas might lead to different orders of transactions on different replicas. The DivRep protocol overcomes the problem using NOWAIT, the specific feature enabled on one of the RDBMSs for consistent resolution of the conflict (by aborting the same transaction on all replicas) and allowing the same transaction to eventually become ready to commit. In summary, the difference between the DivRep protocol on the one hand and HRDB/Byzantium protocols on the other hand is in the way the effects of non-determinism are dealt with: the DivRep protocol allows for non-determinism and overcomes its effects when this is needed. HRDB and Byzantium protocols instead merely avoid the effects of non-determinism at the cost of performance overhead.

Handling NOWAIT exceptions leads to performance overhead, too. However, whilst this performance overhead is application specific, it is almost always less than the performance overhead incurred by the use of primary/secondary scheme used by the HRDB protocol with a small number of RDBMSs. DivRep is likely, therefore, to be faster than HRDB in certain applications, e.g. where there is a low abort rate.

The Byzantium replication protocol, as discussed in the Prior Art section, is worse in terms of performance than the HRDB protocol as the operations are executed on the secondaries only once the primary has completed all the operations of a transaction. Thus, the DivRep protocol is highly likely to outperform the Byzantium protocol in a wider range of operational conditions.

Variations to the embodiment described above will now be discussed.

The DivRep protocol described above offers several regimes of operation. The pessimistic regime of operation requires comparison of the responses from RDBMS1 and RDBMS2 and only if no discrepancy is detected will a response be returned to the client. A disadvantage of this scheme is that the slower RDBMS may take much longer to produce a response. The optimistic regime, instead, will return the first response received from either RDBMS 1 or RDBMS 2, optimistically assuming that no mismatch between the responses will occur later when both have been received and adjudicated.

There is a scope for improving performance in processing the edges of transactions. This may be achieved by executing several non-conflicting transaction edges inside a single mutex, possibly in different orders on two RDBMSs. Firstly, if multiple transactions are ready to commit (i.e. the client application has submitted a commit to the respective transactions), these can be executed in the same mutex (the order of the commits might be different on two RDBMSs without compromising the consistency of the replicas, since the situation represents non-conflicting transactions executed in parallel). Secondly, multiple begins can be executed in the same mutex, as they will merely cause the same snapshot of the data to be used in multiple transactions (the order of the begins might be different on two RDBMSs without compromising the consistency of the replicas). The relative order between commits and begins, however, has to be the same on all RDBMSs.

The replication protocol described above can be applied with a range of error handling mechanisms, which are briefly discussed below.

In case a discrepancy is detected between the responses by the RDBMSs, the replication protocol may use a diagnosis module to determine which of the two replicas has failed. The embodiment described here intentionally does not commit to a particular diagnostic routine as different diagnosis techniques can be applied in different embodiments. One possibility which is considered is the use of 'rephrasing rules' [Gashi and Popov 2006], in which the diagnosis module would 'rephrase' the operations (SQL statements), which have resulted in different responses by the RDBMSs. This approach is described below purely by way of an illustrative example. As a result of rephrasing, statement invariants (i.e. logically equivalent operations) are derived using the redundancy built in the SQL. The diagnosis consists of submitting to the RDBMSs invariants of the operations. For example, a statement may be placed in a stored procedure and then the stored procedure executed instead of submitting the SQL statement. Then the middleware will compare the responses received for invariants with those obtained for the original statements. If a qualified majority among the responses (for the original statements and their invariants) is reached, then the 'correct' response will be known and in some cases the failed RDBMS will have been identified. For instance, if an RDBMS 'changes' its response between the original response and the invariants produced for it, then it is clearly faulty. Of course, the diagnosis may fail, e.g. a qualified majority is achieved on an incorrect response, but this will typically require majority of the RDBMSs to fail on the particular statement, a situation which is highly unlikely.

Options are available in different embodiments in respect of confinement of errors: when discrepancy is detected, the respective transaction on the failed RDBMS can be aborted.

Submitting to the RDBMS an invariant of the operation, which has triggered the failure, and obtaining a 'correct' response from this RDBMS will be a sufficient error confinement measure, provided the failure did not affect the ACID properties of the RDBMS (i.e. the failure did not outlive the transaction context). An alternative would be to degrade gracefully the affected FT-node to a single replica (i.e. switch off the failed RDBMS from processing any further operations coming from the connected client applications) and subject (possibly after a reboot) the failed RDBMS to scrutiny targeted at identifying whether the error propagated beyond the transaction where the discrepancy occurred by comparing the database on the failed RDBMS with the database of an RDBMS which remains operational within the FT node.

FT-node recovery from a graceful degradation is another aspect which may be achieved in different ways in different implementations of the replication protocol described above. The choice of a particular recovery policy will be dictated by the trade-offs to be struck between availability and thoroughness of the recovery. Several options are possible:
- putting the repaired RDBMS (i.e. which has been switched off the FT-node and subjected to various checks) into a 'catch up' mode, in which a recovery routine would extract from the operational RDBMS of the FT-node a valid snapshot of the databases being recovered and apply these to the databases of the RDBMS being repaired.
- another option would be placing the FT node in a degraded mode to configure the correctly functioning RDBMS for operation in such a way as to store all the database changes (write sets) applied to this RDBMS in a form suitable for use by the failed RDBMS (e.g. write log). Once the failed RDBMS is ready for a recovery (after a reboot and successful completion of the checks envisaged in error confinement) the write sets from the write log will be applied to the RDBMS being repaired. Such an arrangement will allow for restoring the state of the recovered RDBMS fast (i.e. a fast 'catch up') by applying the changes which have occurred since this RDBMS has been switched off the FT node, instead of applying the whole valid database snapshot as described above, in the first recovery option.

Appendix A—Concepts and Background

Transactions

Database transactions are logical units of work within a relational database management system (RDBMS) that are treated reliably and independently of each other. A transaction represents a unit of interaction with an RDBMS and consists of any number of read and write operations and finishes with either commit or abort. Let $D=\{x_1, x_2, \ldots x_n\}$ be a representation of data items stored in a database and let $r(x_k)$ and $w(x_k)$ be a read and a write operation on data item $x_k$: $x_k \in D$ respectively, and let c and a be the commit and abort operations. A transaction $T_i$ is defined [Bernstein, Hadzilacos et al. 1987] to be a partial order with ordering relation "$<_i$" where:

1) $T_i \subseteq \{r_i(x_k), w_i(x_k) | x \in D\} \cup \{a_i, c_i\}$;
2) $a_i \in T_i$ iff $c_i \notin T_i$;
3) let o be $a_i$ or $c_i$, whichever is in $T_i$, for all other operations $o' \in T_i$: $o' <_i o$; and
4) if $r_i(x_k), w_i(x_k) \in T_i$ then either $r_i(x_k) <_i w_i(x_k)$ or $w_i(x_k) <_i r_i(x_k)$;

The meaning of the conditions 1) to 4) above is as follows: Condition 1) describes the types of operations, Condition 2) indicates that either an abort or a commit is part of a transaction, but not both; Condition 3) indicates the order of operations such that commit or abort (whichever occurs) must follow all other operations in the transaction and Condition 4) indicates that operations on a common database item must be ordered in a particular way.

An implicit assumption is made in the above model: a transaction writes a particular data item only once. This is the reason why in the Condition 4) a pair of write operations is not considered.

The first formal discussion of database transaction properties can be found in [Gray 1981]. Since then a standard approach has emerged in the literature through ACID properties. The acronym ACID stands for the following:

Atomicity—ability to guarantee that either all of the tasks of a transaction are performed or none of them is.

Consistency—ability to preserve the legal states imposed by the integrity constraints. More informally, this means that no rules are broken as a consequence of transaction execution.

Isolation—ability to make operations in a transaction appear isolated from (all) other operations executed by concurrent transactions.

Durability—ability to guarantee that changes made by a transaction are permanent once the transaction successfully completes (commits).

Figure 17:
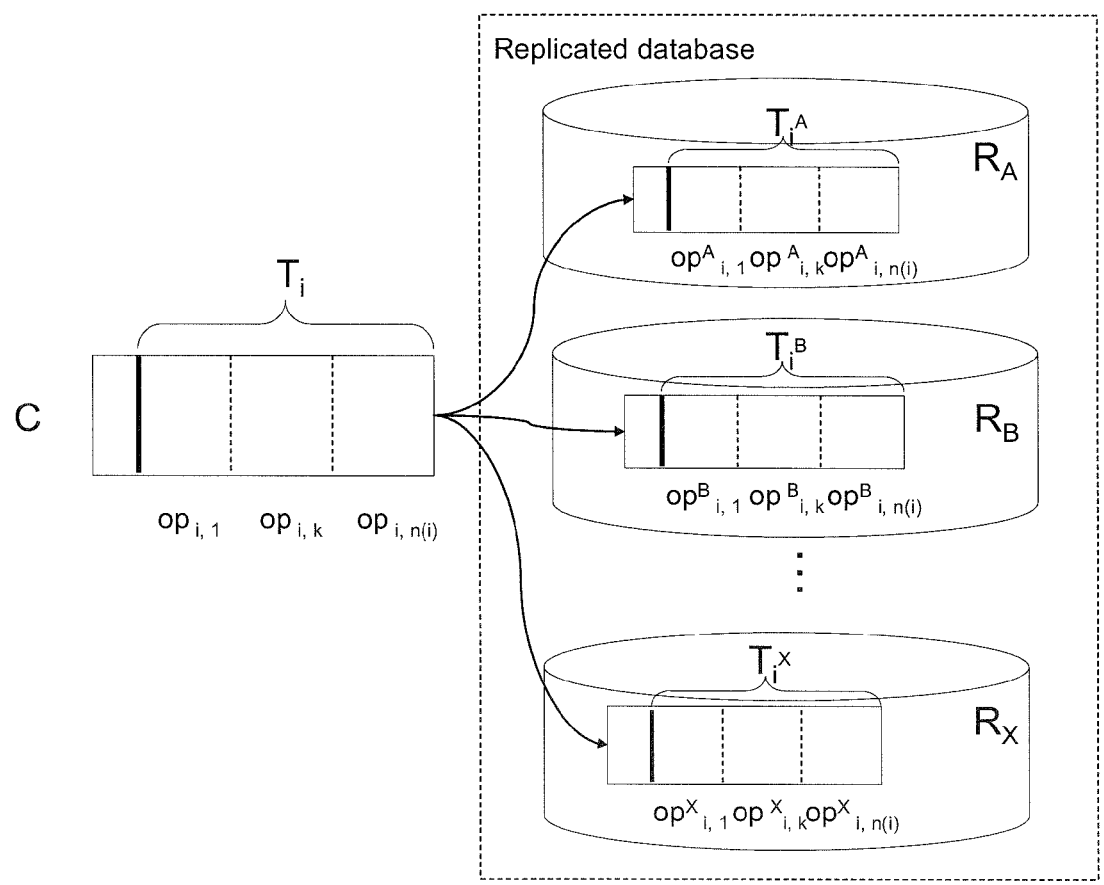
FIG. 17 illustrates generally distributed transactions which comprise execution of one or more operations that, individually or as a group, update and/or read data on two or more distinct nodes of a replicated database.

FIG. 17 shows distributed transactions, which comprise execution of one or more operations that, individually or as a group, update and/or read data on two or more distinct nodes of a replicated database. A distributed transaction must provide ACID properties among multiple participating databases, which are commonly dispersed among different physical locations. More specifically, FIG. 17 illustrates execution of a distributed transaction, $T_i$, in a replicated database. Each operation, op $\in \{op_{i,1}, \ldots, op_{i,k}, \ldots op_{i,n(i)}\}$, of the transaction $T_i$ is initiated at client C and sent to all replicas $\{R_A, R_B, \ldots R_x\}$ in the replicated database. Each of the operations can be one of the following: database item read, database item write, transaction abort or transaction commit. The interaction between the client and the replicated database is simplistic in that it excludes the mechanism that enables the client to perceive the replicated database as a single entity (typically this would be implemented by a middleware). Also, the interaction of other, concurrently executing clients and the replicated database is not shown in the figure.

Isolation Levels

Concurrency control mechanisms in RDBMSs ensure that transactions execute concurrently without violating data integrity of a database. A property of concurrency control mechanisms is the provision of different degrees of isolation between the transactions' executions—these mechanisms determine when the modifications of one transaction become visible to other, concurrent transactions. However they should also prevent concurrent executions which exhibit worse performance than a serial execution (Second Law of Concurrency Control [Gray and Reuter 1993]). A component in an RDBMS, referenced to as scheduler, manages the overlapping executions of transactions. A scheduler receives operations from users and makes sure that they are executed in a correct way, according to the specified isolation level(s).

Out of all ACID properties, the isolation property is of particular interest. The isolation property has appeared for the first time under the term Degrees of Consistency in [Gray, Lorie et al. 1975]. Different types of isolation have been proposed. The ANSI SQL standard specifies four levels of isolation [ANSI 1992]: serializable, repeatable read, read committed and read uncommitted. The highest level of isolation is the serializable level, which requires every history of transaction executions (i.e. the order in which the operations of the different transactions are executed) to be equivalent to a serial history, i.e. in a serializable history, transactions appear to have executed one after another without overlapping. Lower isolation levels are less restrictive but they can introduce inconsistencies during transaction executions, i.e. they offer better performance at the expense of compromising consistency. Due to its impact on system performance, isolation is the most frequently relaxed ACID property. The trade-off between data consistency and performance is an inherent part of any RDBMS's concurrency control mechanism.

The ANSI SQL isolation levels have been criticised in [Berenson, Bernstein et al. 1995] and [Adya, Liskov et al. 2000] because they do not accurately capture the isolation levels offered by many RDBMS products. The work in these two papers has shown that the three phenomena defined by ANSI SQL for characterising the isolation property are ambiguous and they fail to distinguish between all possible anomalous behaviours of different isolation levels. Therefore, the work in [Berenson, Bernstein et al. 1995] defines an additional isolation level, snapshot isolation (SI), which is offered in leading commercial and open-source database systems (Oracle, Microsoft SQL Server, with certain variations, Sybase, PostgreSQL etc.).

Snapshot Isolation (SI)

SI is the isolation level assumed in the database products used in the DivRep protocol of the present invention. It is commonly implemented using extensions of multiversion mixed method described in [Bernstein, Hadzilacos et al. 1987], and the ANSI SQL standard places it between the two strictest isolation levels, repeatable read and serializable isolation level. A transaction executing in snapshot isolation operates on a snapshot of committed data, which is obtained when transaction begins; the changes of the transactions committed after the begin are invisible to the transaction. Snapshot isolation guarantees that all reads of a transaction see a consistent snapshot of the database (i.e. repeatable read is achieved). Additionally, any write performed during the transaction will be seen by subsequent reads within that same transaction. In case a write-write conflict occurs between transactions (i.e. when write operation(s) of two or more concurrent transactions attempt to modify the same data item(s)) at most one of these can be committed. The other transactions, involved in the write-write conflict have to be aborted. An attempt by a client application to commit more than one transaction involved in a write-write conflict typically leads to the RDBMS overriding the client commit and aborting all but one of the write-write conflicting transactions.

In general, concurrent transactions are defined as follows: for a begin operation, b, and a commit operation, c, where $b_i$, $c_i \in T_i$ and $c_j \in T_j$, the two transactions, $T_i$ and $T_j$, are considered to be concurrent if the following holds: $b_i < c_j < c_i$.

Snapshot isolation has the advantage of avoiding conflicts between read-read and read-write operations—the executions of any pair of concurrent read operations, or any pair of concurrent read and write operation never conflict. These properties improve performance and make SI more appealing than the traditional serializable isolation level. This is particularly evident in the workloads characterised with long-running read-only transactions and short modifying transactions.

Most RDBMSs which offer the snapshot isolation level use Strict-2-Phase-Locking (S2PL). In the first phase, the transaction acquires exclusive locks for writing data items. These locks are released in the second phase, only once the transaction has finished with a commit or abort. Instead of waiting for a transaction commit and using first-committer-wins rule, these concurrency control mechanisms commonly check for write-write conflicts at the time the transaction executes a write operation and apply the first-updater-wins rule [Fekete, O'Neil et al. 2004]. This mechanism is now explained in more detail below.

In order to write a data item y, transaction $T_i$ has to obtain an exclusive lock on y. There are two possible cases:
  a) if the lock is available, $T_i$ performs a version check against the executions of the concurrent transactions. Two outcomes are likely: if a concurrent transaction had modified the same data item and it had already committed, $T_i$ has to abort (if first-updater-wins rule is used $T_i$ aborts as soon as it tries to modify the data item; or if first-committer-wins rule is used $T_i$ aborts when it attempts to commit, see FIG. 18, Case a)); otherwise it performs the operation.
  b) If the lock is unavailable, because another transaction $T_j$ has an exclusive access, $T_i$ is blocked. If $T_j$ commits, $T_i$ will have to abort (similarly to the Case a) above, if first-updater-wins rule is used $T_i$ aborts as soon as $T_j$ has committed, or if first-committer-wins rule is used $T_i$ aborts when it attempts to commit), see FIG. 18, Case b)). On contrary, if $T_j$ aborts, $T_i$ will be granted the exclusive lock on y so that it can proceed and potentially commit successfully if no conflicts with other concurrent transactions occur.

If the first-updater-wins rule is used, in either of the above cases a) or b), the key is that the version checks are performed at the time $T_i$ attempts to create a version, and not when it attempts to commit. This is called a version-creation-time conflict check.

Figure 18:
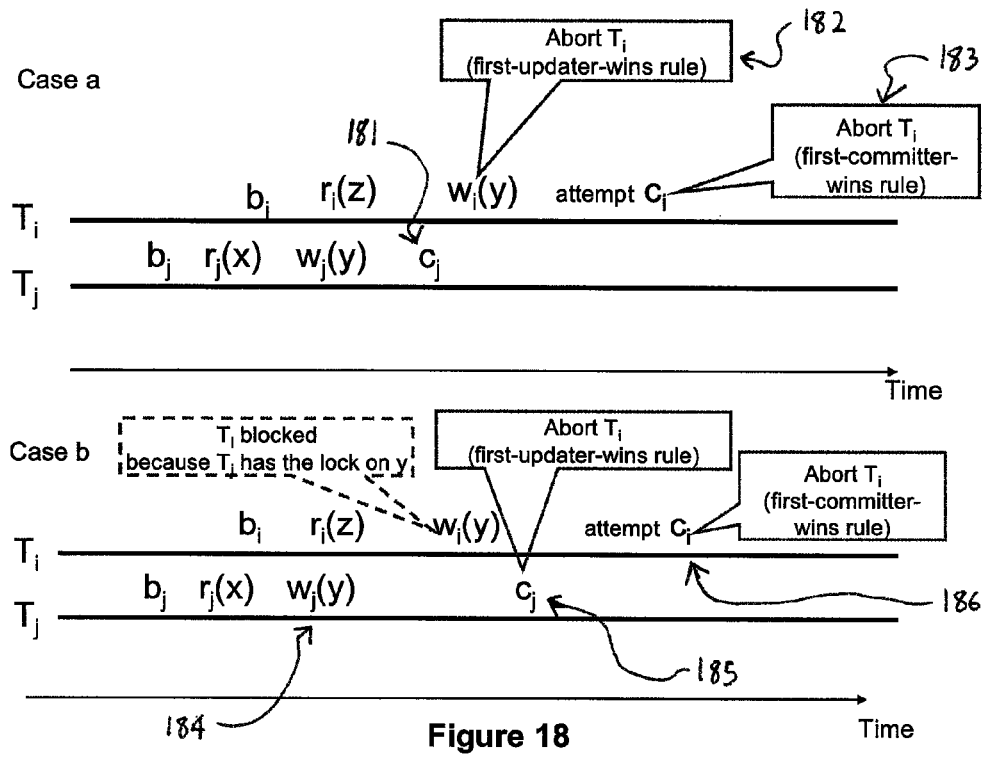
FIG. 18 shows a timing diagram showing generally the use of Strict 2-Phase Locking concurrency control and first-updater-wins and first-committer-wins rules for enforcing Snapshot Isolation.

FIG. 18 is a timing diagram showing the use of Strict 2-Phase Locking concurrency control and first-updater-wins and first-committer-wins rules for enforcing Snapshot Isolation. Case a) shows that transaction $T_i$ is aborted after the concurrent transaction $T_j$ modified a same data item (y) and committed 181—the abort occurs either, as soon as $T_i$ attempts to write the data item y (first-updater-wins rule) 182 or when $T_i$ attempts to commit (first-committer-wins rule) 183. Case b) shows that $T_i$ is aborted after the concurrent transaction $T_j$ modified 184 a same data item, y, and committed—the abort occurs either as soon as $T_j$ commits 185 (first-updater-wins rule) while $T_i$ is waiting to acquire the lock, or when the $T_i$ attempts to commit (first-committer-wins rule) 186.

Database Replication

Database replication is a process of sharing data between redundant resources, which typically belong to a system of physically distributed nodes (commonly referred to as replicas). A replicated database system implements either a full replication (every node stores a copy of all data items) or a partial replication (each node has a subset of data items). The present invention is concerned with the former.

Database replication is a thoroughly studied subject. Two main challenges of database replication are concurrency control and replica control. The former aims at isolating transactions with conflicting operations (see FIG. 19), while the latter ensures the consistency of data on all replicas (see FIG. 20). The need for replica control arises due to the inherent non-determinism in the execution of transaction operations on different replicas—the data stored on different replicas, which are initially consistent, could diverge because differently ordered message sequences are supplied to each replica. This happens, for example, as a result of the operating systems, on top of which the replicas are running, scheduling the transaction operations in different, non-deterministic order.

Figure 19:
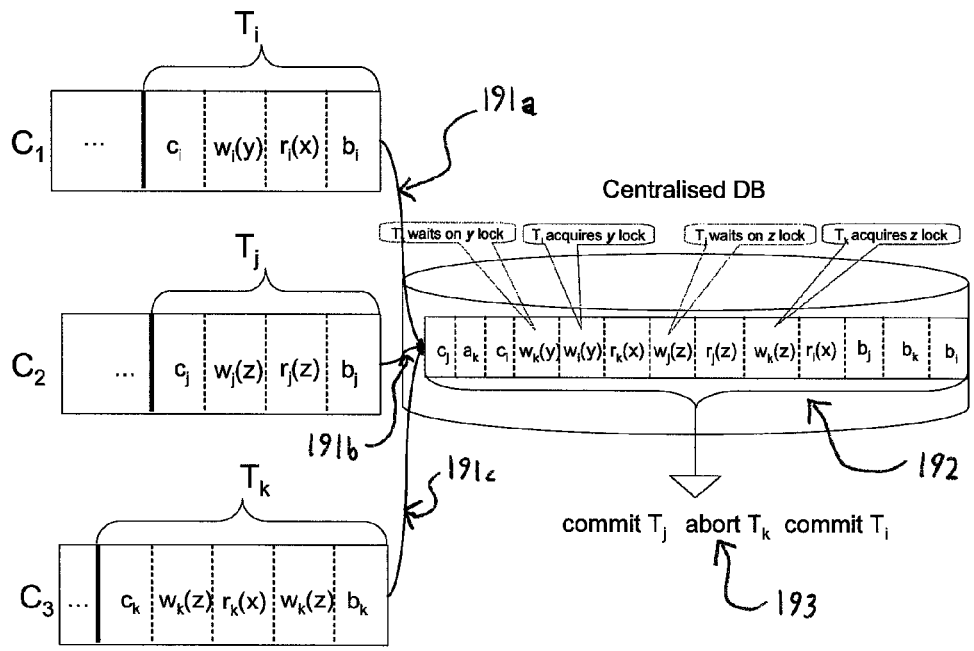
FIG. 19 shows generally an example of a concurrency control mechanism, based on Strict 2-Phase Locking, enforcing Snapshot Isolation on a centralised, non-replicated database.

Referring now to FIG. 19, an example of a concurrency control mechanism, based on Strict 2-Phase Locking, enforcing Snapshot Isolation on a centralised, non-replicated database, is shown. Three clients ($C_1$, $C_2$ and $C_3$) execute respective transactions ($T_i$, $T_j$ and $T_k$) 191a, 191b, 191c to concurrently access the database. $T_i$ reads data item x, and writes data items y; $T_j$ reads and writes data item z and $T_k$ writes data items y and z and reads data item x. Therefore, the transactions $T_i$ and $T_j$ both conflict with transaction $T_k$ (write-write conflicts between the $T_i$ and $T_k$ ensue because both transactions attempt to write data item y, and similarly between $T_j$ and $T_k$ due to the concurrent writing of the data item z). The execution of each transaction proceeds from right to left, e.g. the first operation in each transaction (the respective begin operations: $b_i$, $b_j$ and $b_k$) are depicted in the rightmost positions of the respective clients' queues. Each client sends the operations of the respective transaction to the database, which in turn uses the concurrency control mechanism to place the operations in a particular order 192 (one such possibility is shown in the figure).

Transaction $T_i$ is the first to acquire the lock for writing data item y (the leftmost green callout indicates that $w_i(y)$ is the first modification of the data item y in the database queue). As a result, $T_k$ will be blocked waiting for the lock on y (indicated by the leftmost red callout), and thus once $T_i$ commits, $T_k$ must abort according to the rules of Snapshot Isolation. As a consequence of $T_k$ aborting, the third transaction, $T_j$, will end the waiting for the write lock on data item z (indicated by the rightmost red callout) and subsequently commit—once $T_k$ aborts, all its modifications are discarded and the lock on all data items released (including the lock on the data item z, shown to be initially acquired with the rightmost green callout), and thus $T_j$ is allowed to make the changes to z and then commit successfully 193.

Figure 20:
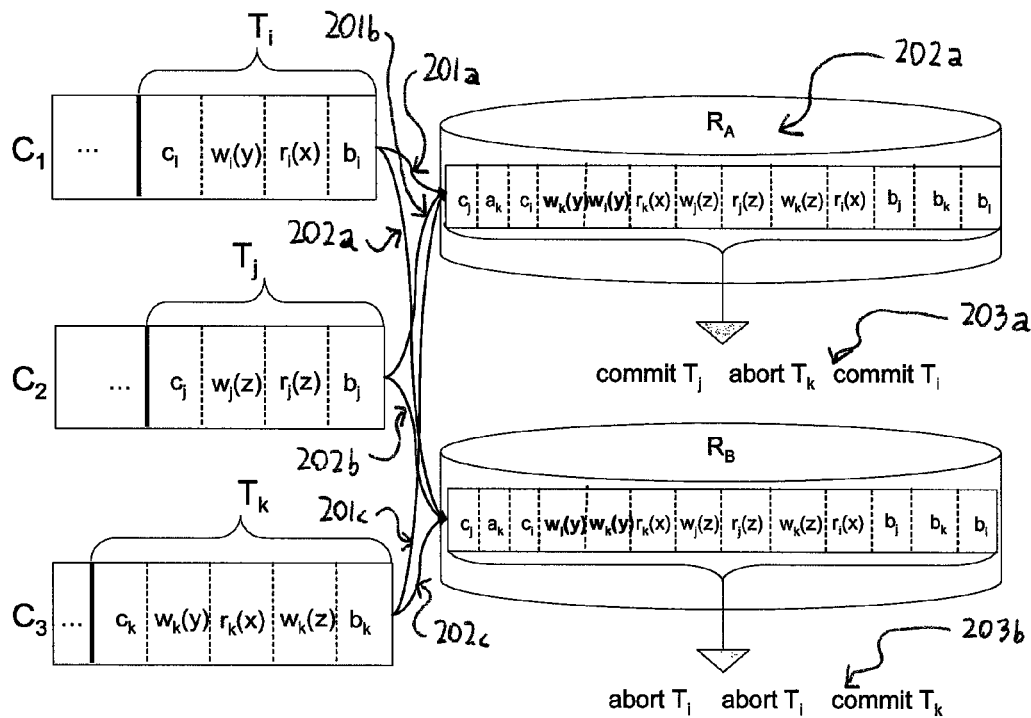
FIG. 20 shows generally an example of different transaction serialisation decisions made by the concurrency control mechanisms, based on Strict 2-Phase Locking, of two RDBMSs in a replicated database.

FIG. 20 illustrates an example of different transaction serialisation decisions made by the concurrency control mechanisms, based on Strict 2-Phase Locking, of two RDBMSs in a replicated database. Three clients ($C_1$, $C_2$ and $C_3$) execute respective transactions ($T_i$, $T_j$ and $T_k$) to concurrently access the database, providing these operations to replica $R_A$ 201a, 201b, 201c and to replica $R_B$ 202a, 202b, 202c. $T_i$ reads data item x, and writes data items y; $T_j$ reads and writes data item z and $T_k$ writes data items y and z and reads data item x. The concurrency control mechanism on replica $R_A$ schedules 202a the operations of the three transactions in a particular order: $T_i$ and $T_j$ are committed, and $T_k$ is aborted 203a (as explained in FIG. 19). The order of operations execution is scheduled differently 202b on replica $R_B$, and as a result $T_k$ is the only transaction to commit since it is the first to acquire the locks for both y and z 203b. To avoid installing inconsistent data on the two databases, due to different serialisation order by replicas' concurrency control mechanisms, a replica control protocol must be in place.

There are different parameters that can be used for classification of database replication protocols [Gray, Helland et al. 1996], [Sales, Jimenez-Peris et al. 2006], such as:

1) the place where the write operations (initially) take place;
2) the time when the write operations take place;
3) the number of messages exchanged; and
4) the assumed concurrency control mechanism etc.

Parameter 1) divides the solutions into primary/secondary and update everywhere approaches. The primary/secondary approach designates only one replica to accept the writes. By contrast, in the update everywhere approaches, writes are executed on all (available) replicas. The forwarding of updates to remote replicas incurs an overhead in the primary copy approach while the most common challenge in update everywhere replication is conflict resolution.

The second parameter, 2), divides the solutions into eager and lazy replication. Eager solutions guarantee that the writes are propagated to all replicas before transaction commit. This has a negative impact on system performance, but ensures database consistency in a straightforward way. Lazy solutions perform writes on remote replicas after commit. They offer improved performance at the possible expense of compromising database consistency. If two transactions update different copies for the same data item with different values, data become inconsistent. The inconsistencies are eventually reconciled outside the boundaries of the initial transactions.

Another classification of database replication protocols identifies two broad groups: black-box (commonly referred to as middleware-based), and white-box (commonly referred to as kernel-based) approaches. The protocols of the former group are easier to develop and can be maintained independently from the database servers they operate on. On the other hand, they are at a disadvantage because no access to the potentially useful concurrency control mechanism of the database server kernel is available. Thus, concurrency/replica control might need to be performed on a coarser level of granularity. In addition, there exist gray-box protocols which combine the black-box approaches with a (limited) set of features from database server kernels [Jimenez-Peris and Patino-Martinez 2003], [Patino-Martinez, Jimenez-Peris et al. 2005].

ROWAA-Based Replication

Eager replication protocols have been based on the read-one/write-all ROWA(A) approach [Bernstein, Hadzilacos et al. 1987]. While read operations are executed only at one replica (asymmetric reading) in ROWA(A), updates are performed on all (available) replicas.

As suggested in [Kemme 2000] one of the drawbacks of traditional ROWAA solutions is the message overhead. If the updates of a transaction are executed immediately on all replicas, an update message involves a request and an acknowledgement per each copy of data item. Clearly, this will have a significant impact on the scalability of this approach. It is also the case that aborting a transaction will cost less if the update has been executed only on a single replica than if the updates have been immediately propagated to all replicas.

Deferred writing [Bernstein, Hadzilacos et al. 1987] was proposed as an alternative to immediate writing employed in early versions of eager, update anywhere protocols. All the writes are executed on one (local) replica and at the end of a transaction they are bundled together in one message and sent to all other (remote) replicas. Deferred writing, however, exhibits an overhead because the commitment of each transaction will be delayed by possible large volume of writes to be executed on the remote replicas in the end of the transaction. The execution of writes in the critical path is somewhat minimised with the use of WriteSets—the modifications to data items made by a transaction on the local replica are extracted and propagated to the remote replicas in a single message to be applied on each (asymmetric writing), instead of executing full SQL operations. This drawback does not exist when using immediate writing approach where processing of the writes happens in parallel on all replicas.

Another drawback of deferred writing is that detection of possible conflicts among transactions is delayed. While immediate writing might detect conflict during the execution of transactions, the conflict detection is performed at the end of transaction executions when deferred writing is the technique of choice.

Correctness in Replicated Databases

Figure 21:
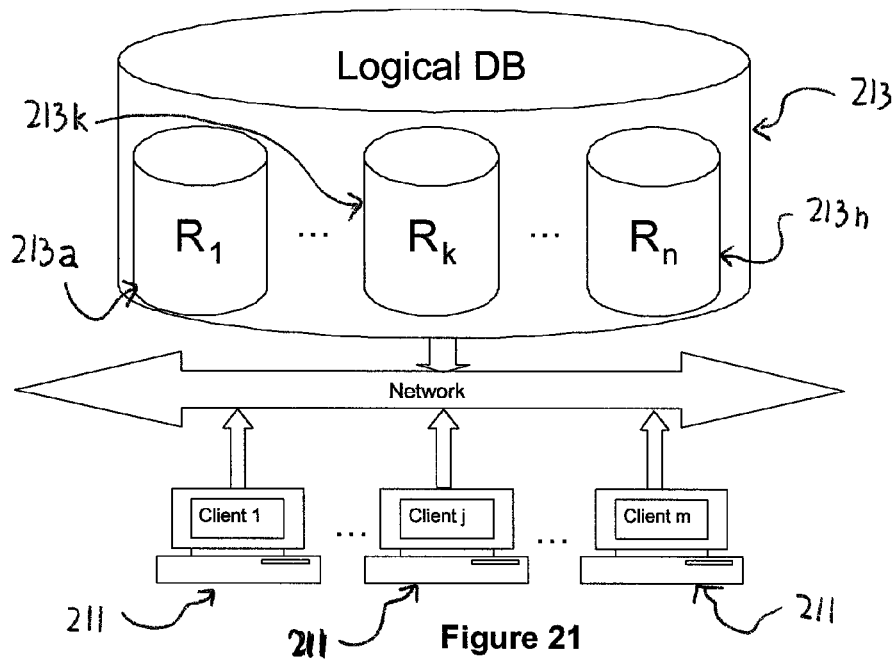
FIG. 21 is a schematic block diagram which shows generally the interaction between clients and replicated DBs.

The strongest correctness criterion for replicated databases is 1-copy serializability (1-copy SR) [Bernstein, Hadzilacos et al. 1987]. It represents an extension of the conflict-serializability defined for centralized databases. The criterion states that a replication protocol ensures 1-copy SR if for any interleaved execution of transactions there is an equivalent serial execution of those transactions performed on the logical copy of the database, see FIG. 21. More specifically, FIG. 21 is a schematic block diagram representing the interaction between clients 211 and replicated DBs 213a . . . n. The replicated databases appear to clients as one logical entity 213.

Lin et al. [Lin, Kemme et al. 2005] defined criteria for correctness of replicated databases when each of the underlying replicas offers snapshot isolation. The correctness criterion, referred to as 1-copy snapshot isolation (1-copy-SI), guarantees that an execution of transactions over a set of replicas produces a global schedule that is equivalent to a schedule produced by a centralised database system which offers snapshot isolation.

Similarly to 1-copy-SI, Elnikety et al. [Elnikety, Zwaenepoel et al. 2005] defined Generalised Snapshot Isolation (GSI)—a correctness criterion for replicated databases that offer snapshot isolation. GSI is an extension to the snapshot isolation as found in centralized databases. The authors formalize the "centralized" snapshot isolation and refer to it as Conventional Snapshot Isolation (CSI).

The DivRep protocol of the present invention assumes that underlying databases offer snapshot isolation and thus the latter two correctness criteria, 1-copy SI and GSI, apply to the present invention.

Conflicts and Deadlocks

Figure 22:
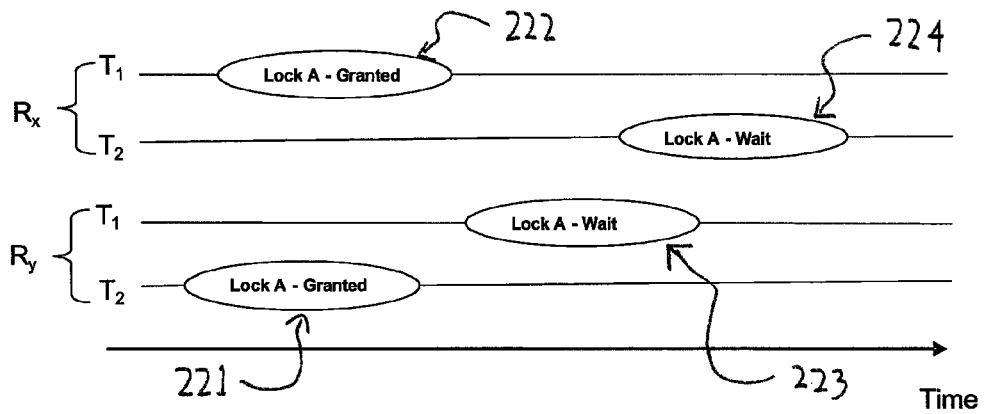
FIG. 22 shows generally the competition between two concurrent transactions competing for a data item while executing in a replicated database system with two replicas.

Earlier sections indicated how conflicts between concurrent transactions can ensue. Certain database replication solutions are prone to a specific conflict situation—distributed deadlock. This happens if the lock for a data item is acquired in different order on different replicas. FIG. 22 shows two concurrent transactions $T_1$ and $T_2$, which are competing for data item A, while executing in a replicated database system with two replicas $R_x$ and $R_y$. The order of lock requests by $T_1$ and $T_2$ is different on the two replicas, i.e. $T_2$ is blocked 224 waiting for $T_1$ on $R_x$ and vice versa is true on $R_y$. As a result, in the replication schemes where a transaction commits only after all the replicas are ready to do so, the transactions would be deadlocked without possibility to progress further, unless a dedicated deadlock detection mechanism of the distributed database protocol is in place to resolve the conflict.

It has been suggested that group communication systems (GCS) [Hadzilacos and Toueg 1993] be used as a means of reducing conflicts and avoiding deadlocks as well as ensuring consistent data on multiple replicas. A GCS makes it possible for any replica to send a message to all other replicas (including itself) with the guarantee that the message will be delivered if no failures occur. These systems are capable of ensuring that a message multicast in a group will be delivered in the same, system-wide total order on all group members, i.e. database replicas. This holds for the sender of the message too. Many replication protocols, e.g., [Agrawal, Alonso et al. 1997], [Kemme and Alonso 2000] combine group communication primitives with an asymmetric writes technique, in which, usually, the write operations of a transaction are executed on one replica, grouped in one message (WriteSet) and delivered to all the replicas in the same total order, see FIG. 23. The installation of the WriteSets in the same total order is necessary to avoid data inconsistencies due to non-determinism of the replicas. Otherwise, if the total order was not respected it would be possible that two replicas install overlapping WriteSets in a different order, which would result in an inconsistent state of the replicated system.

Figure 23:
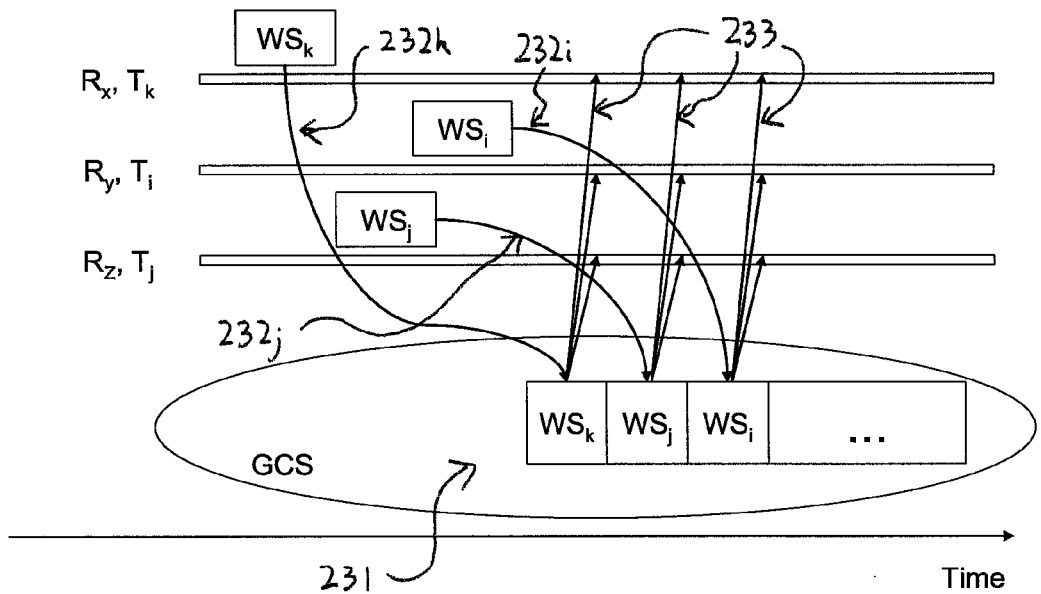
FIG. 23 shows a high-level schematic representation of a Group Communication Scheme (GCS) used for consistent database replication in a general replication scheme with multiple replicas.

Referring to FIG. 23 in greater detail, a high-level schematic representation of a Group Communication System (GCS) 231 used for consistent database replication is shown. FIG. 23 shows three concurrent, modifying transactions, $T_k$, $T_i$ and $T_j$, are being executed on the three replicas, $R_x$, $R_y$, $R_z$, respectively. Each transaction execution comprises the following: transaction operations, reads and writes, are executed on the local replica (not shown in the figure); the results of the write operations are extracted in a WriteSet (WS) and sent 232i, 232j, 232k to the underlying GCS 231; the GCS delivers 233 the WriteSets in the consistent, total order on all replicas. The total order is not necessarily the same as the order in which the WriteSets are received by the GCS.

Transaction Atomicity

In replicated databases atomicity of a transaction has to be guaranteed—it is necessary to make sure that all replicas terminate the transaction in the same way, i.e. all replicas either commit or abort a transaction. As described in [Weismann, Pedone et al. 2000] there are two techniques to ensure transaction atomicity in a replicated database system: voting and non-voting technique. Voting techniques, traditionally, use atomic commitment protocols to terminate transactions. A well-known variant of the atomic commitment protocol is the 2-Phase Commit (2PC) protocol [Skeen 1981]. The phases of a 2PC protocol could be summarised as follows:

A coordinator sends a request to each replica for a vote (to commit or abort).

Upon receiving the request each replica replies with a message, YES (commit) or NO (abort). If the vote is NO the replica aborts the execution.

Upon collecting all the votes, the coordinator decides on the outcome of the transaction:

If all replicas have voted YES, the coordinator notifies the replicas to commit.

If a replica voted NO, the coordinator notifies the replicas to abort.

Upon receiving the notification (commit or abort) from the coordinator, a replica decides accordingly.

REFERENCES

[Adya, A., B. Liskov, et al. 2000] "Generalized Snapshot Isolation Levels". IEEE International Conference on Data Engineering (ICDE) San Diego, Calif.

[Agrawal, D., G. Alonso, et al. 1997] "Exploiting Atomic Broadcast in Replicated Databases". In Proceedings of EuroPar (EuroPar '97), Passau (Germany).

[ANSI 1992] "ANSI X3.135-1992", American National Standard for Information Systems.

[Berenson, H., P. Bernstein, et al. 1995] "A Critique of ANSI SQL Isolation Levels". SIGMOD International Conference on Management of Data, San Jose, Calif., United States, ACM Press New York, N.Y., USA.

[Bernstein, A., V. Hadzilacos, et al. 1987] *"Concurrency Control and Recovery in Database Systems"*. Reading, Mass., Addison-Wesley.

[Elnikety, S., W. Zwaenepoel, et al. 2005] "Database Replication Using Generalized Snapshot Isolation". Proceedings of the 24th IEEE Symposium on Reliable Distributed Systems (SRDS '05), IEEE Computer Society.

[Fekete, A., E. O'Neil, et al. 2004] "A read-only transaction anomaly under snapshot isolation" *ACM SIGMOD Record* 33(3): 12-14.

[Gashi, I. and P. Popov 2006] "Rephrasing Rules for Off-the-Shelf SQL Database Servers". Sixth European Dependable Computing Conference, 2006. EDCC '06.

[Gashi, I., P. Popov, et al. 2007] "Fault tolerance via diversity for off-the-shelf products: a study with SQL database server" *IEEE Transactions on Dependable and Secure Computing*.

[Gray, J. 1981] "The Transaction Concept: Virtues and Limitations". 7th International Conference on Very Large Data Bases (VLDB), Cannes, France, IEEE Computer Society.

[Gray, J., R. Lode, et al. 1975] "Granularity of locks and degrees of consistency in a shared data base". *"IFIP Working Conference on Modelling of Data Base Management Systems"*. Freudenstadt.

[Gray, J. and A. Reuter 1993] *"Transaction processing: concepts and techniques"*, Morgan Kaufmann.

[Hadzilacos, V. and S. Toueg 1993] "Fault-tolerant broadcast and related problems". *Distributed Systems*. S. Mullander, Addison-Wesley: 97-145.

[Jimenez-Peris, R. and M. Patino-Martinez 2003] "D5: Transaction Support", ADAPT Middleware Technologies for Adaptive and Composable Distributed Components: 20.

[Kemme, B. 2000] "Database Replication of Clusters of Workstations". *"Swiss Federal Institute of Technology"*. Zurich: 145.

[Kemme, B. and G. Alonso 2000] "Don't be lazy, be consistent: Postgres-R, a new way to implement Database Replication". Int. Conf. on Very Large Databases (VLDB), Cairo, Egypt.

[Kemme, B. and S. Wu 2005] "Postgres-R(SI): Combining Replica Control with Concurrency Control based on Snapshot Isolation". International Conference on Data Engineering, Tokyo, Japan, IEEE Computer Society.

[Lamport, L., R. Shostak, et al. 1982] "The Byzantine Generals Problem" *ACM Transactions on Programming Languages and Systems (TOPLAS)* 4(3): 382-401.

[Lin, Y., B. Kemme, et al. 2005] "Middleware Based Data Replication Providing Snapshot Isolation". ACM SIGMOD International Conference on Management of Data, Baltimore, Md., ACM Press.

[Mullender, S. 1993] *"Distributed Systems"*. New York, USA, ACM Press/Addison-Wesley Publishing Co.

[Patino-Martinez, M., R. Jimenez-Peris, et al. 2005] "MIDDLE-R: Consistent database replication at the middleware level" *ACM Transactions on Computer Systems (TOCS)* 23(4): 375-423.

[Preguiça, N., R. Rodrigues, et al. 2008] "Byzantium: Byzantine-Fault-Tolerant Database Replication Providing Snapshot Isolation". Fourth Workshop on Hot Topics in System Dependability.

[Skeen, D. 1981] "Nonblocking commit protocols". Proceedings of ACM SIGMOD International conference on management of data, Ann Arbor, Mich., ACM Press, New York, N.Y., USA.

[Vandiver, B. 2008] "Detecting and Tolerating Byzantine Faults in Database Systems". *"Programming Methodology Group"*. Boston, Massachusetts Institute of Technology. PhD: 176.

[Weismann, M., F. Pedone, et al. 2000] "Database Replication Techniques: a Three Parameter Classification". 19th IEEE Symposium on Reliable Distributed Systems (SRDS '00), Nurnberg, Germany, IEEE.

The invention claimed is:

1. A fault-tolerant node for synchronous heterogenous database replication whereby the fault-tolerant node is adapted to carry out a series of database transactions generated by a processor executing a computer program at the fault-tolerant node, wherein the fault-tolerant node comprises at least three relational database management systems, the systems being instances of different relational database management system products which provide snapshot isolation between concurrent transactions and each system comprising a database and a database management component, wherein for each database transaction, operation instructions are provided concurrently to each of the systems to carry out operations on their respective databases and to provide respective responses;

wherein the responses generated by the systems comprise either an operation result or an exception, and where only one of the systems is configured with a NOWAIT exception function enabled which returns an exception when it is detected that two or more concurrent transactions are attempting to modify a same data item and all other systems are configured with the NOWAIT exception function disabled, whereby the fault-tolerant node is adapted to detect that two or more concurrent transactions are attempting to modify the same data item and to block one or more of the transactions to ensure that all systems apply a same order of modification of the data item by the concurrent transactions.

2. A fault-tolerant node as claimed in claim 1, wherein a set of operation instructions includes a begin instruction, a commit instruction and an abort instruction for control of execution of a transaction.

3. A fault-tolerant node as claimed in claim 2, wherein the set of operations comprises a read operation and a write operation, and wherein in executing a write operation the node is adapted first to extract a write set on which operations are performed before the transaction is committed.

4. A fault-tolerant node as claimed in claim 1, wherein the fault-tolerant node comprises a transaction manager to control the execution of the operations for one transaction in each of the systems and a replica manager for each of the systems used to execute a transaction to provide operations to its associated system, wherein for each transaction, the transaction manager provides operations required for execution of the transaction into a queue for each system managed by the replica manager for that system, wherein the operations are provided to each system from the queue by the replica manager for that system.

5. A fault-tolerant node as claimed in claim 1, wherein the fault-tolerant node comprises a comparator function to compare operation results received from the systems to enable the fault-tolerant node to determine whether the transaction has completed successfully.

6. A fault-tolerant node as claimed in claim 5 wherein a set of operation instructions includes a begin instruction, a commit instruction and an abort instruction for control of execution of a transaction, wherein only one transaction can execute a begin instruction or a commit instruction at a time for all the systems, and, whereby on mismatch between the operation results received from the systems the fault-tolerant node is adapted to raise an exception to abort the transaction.

7. A database server comprising a fault-tolerant node for synchronous heterogenous database replication whereby the fault-tolerant node is adapted to carry out a series of database transactions generated by a processor executing a computer program at the fault-tolerant node, wherein the fault-tolerant node comprises at least three relational database management systems, the systems being instances of different relational database management system products which provide snapshot isolation between concurrent transactions and each system comprising a database and a database management component, wherein for each database transaction, operation instructions are provided concurrently to each of the systems to carry out operations on their respective databases and to provide respective responses;
wherein the responses generated by the systems comprise either an operation result or an exception, and where only one of the systems is configured with a NOWAIT exception function enabled which returns an exception when it is detected that two or more concurrent transactions are attempting to modify a same data item and all other systems are configured with the NOWAIT exception function disabled, whereby the fault-tolerant node is adapted to detect that two or more concurrent transactions are attempting to modify the same data item and to block on or more of the transactions to ensure that all systems apply a same order of modification of the data item by the concurrent transactions.

8. A method for performing a synchronous heterogenous database replication, for a series of database transactions provided by a processor executing a computer program, at a fault-tolerant node comprising at least three relational database management systems, the systems being instances of different relational database management system products which provide snapshot isolation with each system comprising a database and a database management component, the method comprising:
receiving a database transaction at the fault-tolerant node;
providing operation instructions for the database transaction concurrently to each of the systems to carry out operations on their respective databases and to provide respective responses;
the systems each generating a response to an operation instruction which comprises an operation result or an exception, wherein only one of the systems is configured with a NOWAIT exception function enabled such that the system returns an exception when it is detected that two or more concurrent transactions are attempting to modify a same data item and all other systems are configured with the NOWAIT exception function disabled;
whereby the fault-tolerant node detects that two or more concurrent transactions are attempting to modify the same data item and ensures that all systems apply a same order of modification of the data item by the concurrent transactions.

9. A method as claimed in claim 8, wherein the fault-tolerant node allows the transactions that accesses the data item first on the system with NOWAIT enabled to proceed on all the systems, and prevents execution of all other transactions attempting to modify the same data item on all the systems, thereby achieving that all systems apply a same order of modification of the data item by the concurrent transactions.

10. A method as claimed in claim 8, wherein a set of operation instructions includes a begin instruction, a commit instruction and an abort instruction for control of execution of a transaction.

11. A method as claimed in claim 10, wherein only one transaction can execute a begin instruction or a commit instruction at a time for all the systems.

12. A method as claimed in claim 10, wherein when an exception is received as an operation result from one of the systems, the fault-tolerant node provides an abort instruction for that transaction for all the systems.

13. A method as claimed in claim 10, wherein execution of a begin operation for a transaction comprises setting a variable indicating that the transaction is not aborted, and by acquiring control of commit and begin operations so that no other begin or commit operation can take place until the begin operation is completed.

14. A method as claimed in claim 10, wherein execution of a commit operation for a transaction comprises determining whether the transaction has been aborted, determining that the operation results from the systems allow a transaction result to be provided, and by acquiring control of commit and begin operations so that no other begin or commit operation can take place until the begin operation is completed.

15. A method as claimed in claim 10, wherein the set of operations comprises a read operation and a write operation, and wherein in executing a write operation the node first extracts a write set on which operations are performed before the transaction is committed.

16. A method as claimed in claim 15, wherein the fault-tolerant node treats a failure to provide an operation result to a read operation or a write operation within a predetermined time as an exception.

17. A method as claimed in claim 8, further comprising comparing operation results received from the systems to enable the fault-tolerant node to determine whether the transaction has completed successfully.

18. A method as claimed in claim 17, further comprising aborting the transaction if the step of comparing operation results indicates a mismatch between operation results received from different systems.

19. A method as claimed in claim 8, further comprising returning a first operation result received from any of the systems to the computer program, and providing a further message to the computer program if a transaction aborts.

20. A method as claimed in claim 8, further comprising returning an operation result to the computer program only when the operation results from all the systems have been received and evaluated by the fault tolerant node.

* * * * *